United States Patent [19]

Taylor et al.

[11] Patent Number: 5,209,560

[45] Date of Patent: May 11, 1993

[54] COMPUTER CONTROLLED LIGHTING SYSTEM WITH INTELLIGENT DATA DISTRIBUTION NETWORK

[75] Inventors: Brooks W. Taylor; Thomas E. Walsh, both of Dallas, Tex.

[73] Assignee: Vari-Lite, Inc., Dallas, Tex.

[21] Appl. No.: 898,385

[22] Filed: Jun. 9, 1992

Related U.S. Application Data

[63] Continuation of Ser. No. 766,029, Sep. 26, 1991, abandoned, which is a continuation-in-part of Ser. No. 555,946, Jul. 19, 1990, abandoned, which is a continuation of Ser. No. 249,225, Sep. 22, 1988, Pat. No. 4,980,806, which is a continuation of Ser. No. 120,743, Nov. 12, 1987, abandoned, which is a continuation of Ser. No. 887,178, Jul. 17, 1986, abandoned.

[51] Int. Cl.$^5$ .............................................. F12V 33/00
[52] U.S. Cl. .................................... 362/85; 362/233; 315/316; 364/132
[58] Field of Search ........................ 364/132, 188, 189; 362/85, 233, 234, 286, 293, 319, 339, 386, 419; 315/292, 293, 299, 315, 316, 317, 318, 319, 320

[56] References Cited

U.S. PATENT DOCUMENTS

| | | | |
|---|---|---|---|
| 2,802,144 | 8/1957 | Spear | 315/292 |
| 2,994,804 | 8/1961 | Skirpan | 315/319 |
| 3,706,914 | 12/1972 | Van Buren | 315/316 |
| 3,784,875 | 1/1974 | Baker | 315/294 |
| 3,845,351 | 10/1974 | Ballmoos | 315/293 |
| 3,898,643 | 8/1975 | Ettlinger | 340/324 A |
| 3,936,712 | 2/1976 | Gerber et al. | 364/188 |
| 4,095,139 | 6/1978 | Symonds | 315/153 |
| 4,158,132 | 6/1979 | O'Dell | 250/205 |
| 4,158,208 | 6/1979 | Dischert | 358/10 |
| 4,240,011 | 12/1980 | Dinges | 315/292 |
| 4,241,295 | 12/1980 | Williams, Jr. | 315/294 |
| 4,257,198 | 6/1980 | Callahan | 385/185 |
| 4,262,338 | 4/1980 | Gaudio, Jr. | 364/900 |
| 4,340,903 | 8/1980 | Tamura | 358/10 |
| 4,514,814 | 9/1985 | Evans | 364/474 |
| 4,519,026 | 5/1985 | Nozawa et al. | 364/167 |
| 4,566,036 | 1/1986 | Kadoswa | 358/210 |
| 4,697,227 | 9/1987 | Callahan | 362/233 |

FOREIGN PATENT DOCUMENTS 1434052 4/1976 United Kingdom.

OTHER PUBLICATIONS

Herbert Lucke, "New Dimmer Controls for TV Studio Lighting", published in *Siemens Review*, 1967.
Century Strand Inc., "Memo-Q Specifications", 1971.
A. Ettlinger & S. Bonsignore, "A CBS Computerized Lighting Control System", vol. 81, *Journal of the SMPTE*, Apr. 1972.
L. C. Hobbs, "Terminals", *Proceedings of the IEEE*, vol. 60, No. 11, Nov. 1972, pp. 99-109.
Joe Wiesbecker, "A Simplified Microcomputer Architecture", *IEEE* Computer Society Magazine, Mar., 1974, pp. 41-47.
D. C. Irving, "Techniques of State and Studio Lighting Control", *The Proceedings of the IEEE*, Nov., 1975.
Dr. D. P. Burton, "Intelligent Lamp Dimmer for Studio Lighting", *New Electronics*, vol. 11, No. 14, Jul. 1978.

(List continued on next page.)

Primary Examiner—Noah P. Kamen
Attorney, Agent, or Firm—Morgan & Finnegan

[57] ABSTRACT

A stage lighting system has a plurality of automated lamp units which can vary the parameters of a light beam for pan, tilt, brightness, intensity and size. A remote console controller system is connected to each of the lamp units via an intelligent data link system. Each of the lamp units includes a microprocessor and a memory. Control programs for driving each of the lamp parameters are stored in the memory and are executed by the lamp microprocessor. The console controller system includes a plurality of controllers, each of which can alternatively or additionally control the operations of the lighting system. The intelligent data link system includes a plurality of signal repeaters, each of which includes a microprocessor and an associated memory for controlling the communication of data and for cooperating in error detection and correction.

33 Claims, 19 Drawing Sheets

OTHER PUBLICATIONS

Kliegl, "Digital Lighting Control System", Feb., 1985.

M. Tada, Japanese Laid Open Patent Publication No. 60/1985-100206.

Summa News Letter, "Summa Technologies Introduces World's First Full-Function Automated Stage Luminaire Controlled Directly By The DMX-512 USITT Communications Standard," Apr./May 1990, pp. 1-8.

Syncrolite Systems, Inc., "Syncrolite Mini-Arc Series II Product Brochure".

Derek Tilsley, "Remote Controlled T.V. Studios", Sound and Vision Broadcasting (GB) vol. 7, No. 3, pp. 19-22, Winter, 1966.

H. C. J. Tarner of BBC Engineering, "Operating Experience with Remote-Control Cameras", pp. 60-66, 1966.

H. C. J. Tarner, "BBC Television News—Alexandra Palace and the Television Center Spur", No. 81, pp. 9-17, Jan. 1970.

Richard Brett, "Electronics at the National Theatre", Electronics and Power Magazine, Oct. 1979, pp. 715 to 718.

D. C. Irving, "Techniques of Stage and Studio Lighting Control", proceedings of the IREE, Nov. 1974, pp. 359-364.

Richard Pilbrow, "Stage Lighting", Light and Lighting, Nov./Dec., 1976, pp. 225 to 227.

K. Okada & F. Nagasaki, "Wireless Control of Studio Lightint", Journal of TV Society, vol. 34, No. 6, pp. 480-484, 1980.

Kliegel Performer II and III specification sheets, Mar. 8, 1982.

Strand Century data sheets for Light Palette Lighting Control Systems, Aug. 1982.

Sherri English, "Oh, No! It's Devo", Lighting Dimensions, Apr./May 1983, pp. 42-49.

Robb Resler, "Disney's Experimental Prototype Community of Tomorrow", Theatre Crafts, Nov./Dec., 1982, pp. 13, 42 and 43.

Jeff Smith, "Entertainment Control System, Epcot's Central Nervous System", Theatre Crafts, Nov./Dec., 1982, pp. 14, 15, 45 to 48, and 50.

Tom Craven, "Carnaval de Lumiere, Mixing Fire and Water", Theatre Crafts, Nov./Dec., 1982, pp. 15, 44 and 45.

John Haupt, "Parade Route Lighting", Theatre Crafts, Nov./Dec., 1982, pp. 16, 17 and 50 to 52.

John Haupt, "Customizing a lighting Console", Nov./Dec., 1982, Theatre Crafts, pp. 17, 53 and 54.

Robb Resler, "Sound and Audio at Epcot, Relaying Signals from ECS". Theatre Crafts, Nov./Dec., 1982, pp. 18 and 54.

H. Lee Pharr, "Sound and Lighting Enclosures for the American Adventure", Theatre Crafts, Nov./Dec., 1982, pp. 20, 60 and 61.

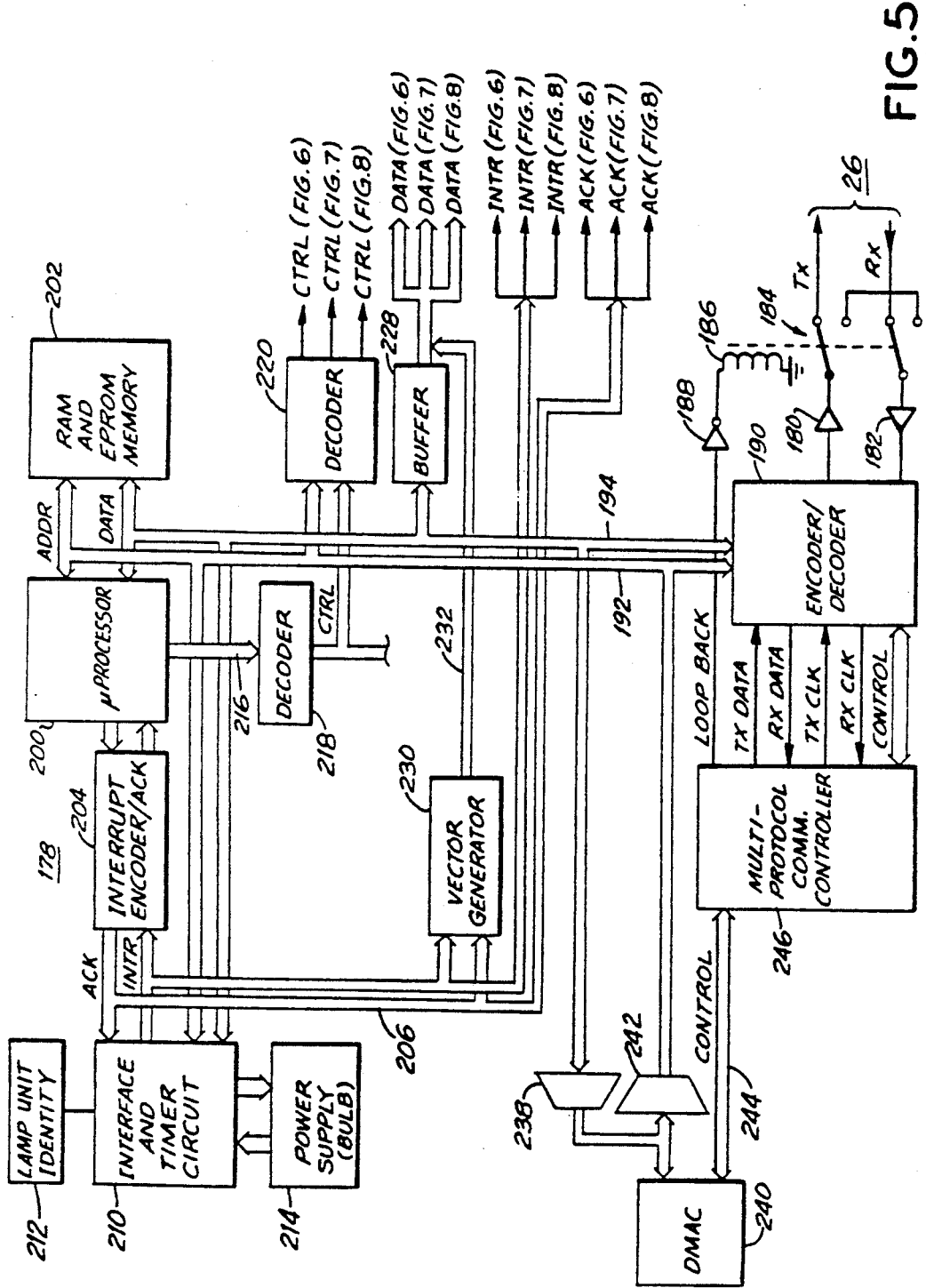

COMPUTER CONTROLLED LIGHTING SYSTEM WITH INTELLIGENT DATA DISTRIBUTION NETWORK

This application is a continuation of application Ser. No. 07/766,029, filed Sep. 26, 1991, abandoned, which is a continuation in part of patent application Ser. No. 07/555,946, filed Jul. 19, 1990, abandoned, which is a continuation of patent application Ser. No. 07/249,225, filed Sep. 22, 1988, now U.S. Pat. No. 4,980,806, which is a continuation of patent application Ser. No. 07/120,743, filed Nov. 12, 1987, abandoned, which is a continuation of patent application Ser. No. 06/887,178, filed Jul. 17, 1986, now abandoned.

TECHNICAL FIELD

The present invention pertains in general to stage lighting systems having intelligent remote lighting fixtures and intelligent data distribution networks.

BACKGROUND OF THE INVENTION

While high performance computer controlled lighting systems such as disclosed in U.S. Pat. No. 4,980,806, (the predecessor of the present application) can readily handle the tasks associated with the remote control of multiple motorized parameter lighting instruments and the communication of large amounts of data for simultaneously executing multiple parameters in hundreds of lamp units, there exists a demand for increased system control flexibility and system reliability. Particularly, enhancements in the communication between or among controllers and the communication to and from the datalink system are needed.

As each major component of the system such as the controller, the datalink or the lamp units becomes increasingly sophisticated and thus plays a bigger role in the system, the failure of any one of them can cause disaster for a performance if such failure is not speedily detected and corrected.

SUMMARY OF THE INVENTION

One embodiment of the lighting system of the present invention includes a communication network between and among console controllers wherein through such network and the main controller, a plurality of other controllers such as a portable controller and an alternative controller may operate the lighting system.

In another aspect of the present invention, an improved data link system includes data repeater circuits which include microprocessors and associated memories for controlling the communication of data and for cooperating in fault detection and correction functions. Examples of these tasks include: reading the output of activity sensors and valid data detectors; determining the operational status of the communications networks; and controlling visual indicators which signal to a system technician the operational status of the networks.

In accordance with another aspect of the present invention, an improved data repeater circuit includes not only a microprocessor and associated memory, but also includes a multi-protocol communications controller circuit to detect certain errors in the data transmissions, even in properly encoded and properly modulated data transmissions.

In accordance with yet another aspect of the present invention, a "smart" repeater includes not only a microprocessor and associated memory, and a multi-protocol communications controller circuit, but also includes a direct memory access (DMA) controller circuit to receive into memory data transmissions which may then be examined by the microprocessor to detect further errors in messages transmitted by either a control console or one or more lamp units.

Repeater circuits of the present invention may also include multiplexers and logic gates which allow the microprocessor to disable certain branches of the communications networks which prove to be the source of erroneous transmissions or noise.

Other advantages of the present invention will become apparent in the following Detailed Description taken with the accompanying Drawings.

BRIEF DESCRIPTION OF THE DRAWINGS

For a more complete understanding of the present invention and the advantages thereof, reference is now made to the following description taken in conjunction with the accompanying drawings in which:

FIG. 5 is an electronic block diagram of the lamp processor system portion of a lamp unit;

DETAILED DESCRIPTION OF THE INVENTION

Figure 1:
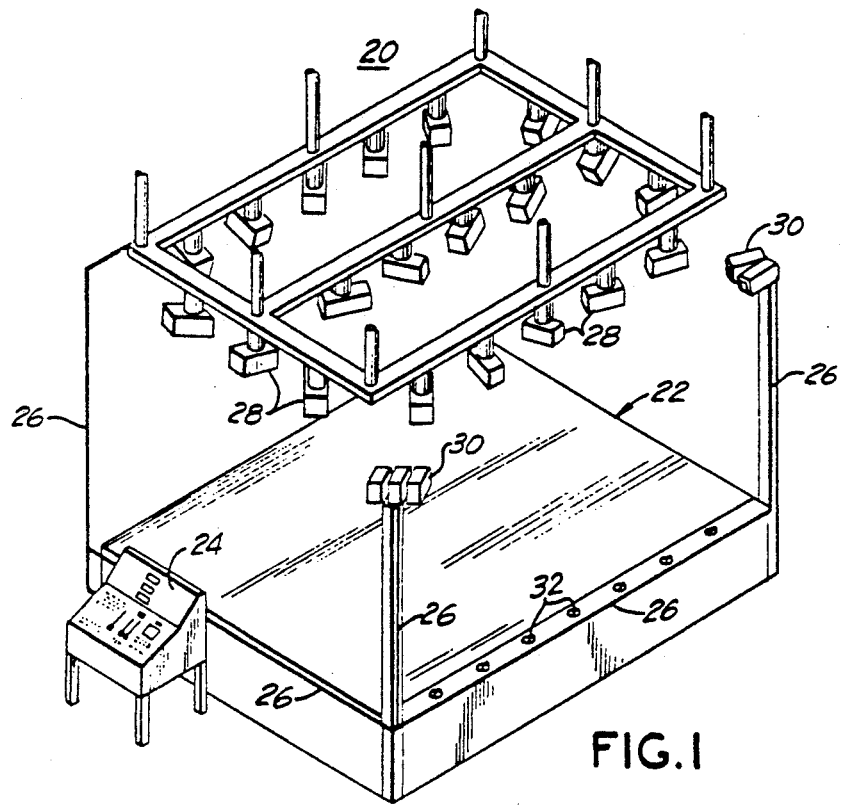
FIG. 1 is a perspective view of a computer-controlled lighting system in accordance with the present invention as set up for illuminating a stage.

The present invention is an automated lighting system for providing illumination to a stage performance. Such automated lighting can provide a wide variety of illumination effects which are not possible with fixed lighting instruments. A typical installation for a computer controlled lighting system 20 in accordance with the present invention is illustrated in FIG. 1. The system 20 is shown as it would be installed for illuminating a performance on a stage 22. The operation of the system 20 is directed by a control console 24 which serves to manually set the lighting effects of the system 20 or to automatically command the system 20 to produce a desired lighting effect determined by stored lighting cues. The console 24 is connected via a data link 26 to each lamp unit within a group of lamp units, one lamp unit being shown by the reference numeral 28.

Each of the lamp units, such as 28, have a unique address such that there can be individual communication between the console 24 and each of the lamp units. The data link 26 is further connected to pedestal lamps, such as 30 and floor lamps, such as 32. The lamps 30 and 32 are fixed but the intensity of these lamps can be controlled by commands generated by the console 24. In operation, the system 20 causes the movable lamps, such as 28, to be adjusted individually for pan, tilt, color, intensity and beam size while the pedestal lamps 30 and floor lamps 32 are adjusted for intensity. With the addition of color-changer mechanisms 34, pedestal lamps 30 can also be adjusted for color. The system 20 is operated to provide a sequence of "cues" for illuminating the stage 22. Each lamp unit in the system 20 can have an individual response required for each of the cues. A complete performance may require the setting of several hundred cues to provide desired lighting effects.

The system 20 illustrated in FIG. 1 shows a small number of lamp units, such as unit 28.

However, an actual stage performance may require several hundred of such lamp units. In fact, a large outdoor rock concert could require the use of up to 1000 lamp units. It can readily been seen that many thousands of commands must be generated for driving each parameter of each lamp for each of the cues within a performance. It is very possible to require ten of thousands of commands during a single performance.

The lighting effects provided by the system 20 must be properly synchronized with the stage performance to produce the programmed entertainment effect. Should any one of the lamps respond incorrectly or fail to respond, the visual effect may be destroyed. It is therefore vitally important that the lamps properly respond to the cues which are initiated by the console 24.

In previous automated lighting systems, it has been necessary for a control processor to generate each command required for setting each parameter for every light in the system. As noted above, this can require that the control processor generate tens of thousands of commands and that each of these commands be accurately conveyed via a data link to the lamps. Should there be any error in the data transmission, the lamp may respond erroneously and harm the visual effect. The electrical environment in the region of a performing stage includes many types of interference due to the heavy consumption of electrical power, for both audio and lighting equipment, in a very limited area. This electrical interference can interfere with the data transmission from the console to the lamps and can cause the lamps to improperly respond. The system 20 of the present invention is designed to overcome many of these problems while providing the capability for almost unlimited expansion in the number of lamps which can be utilized at any one time for a performance.

Figure 2:
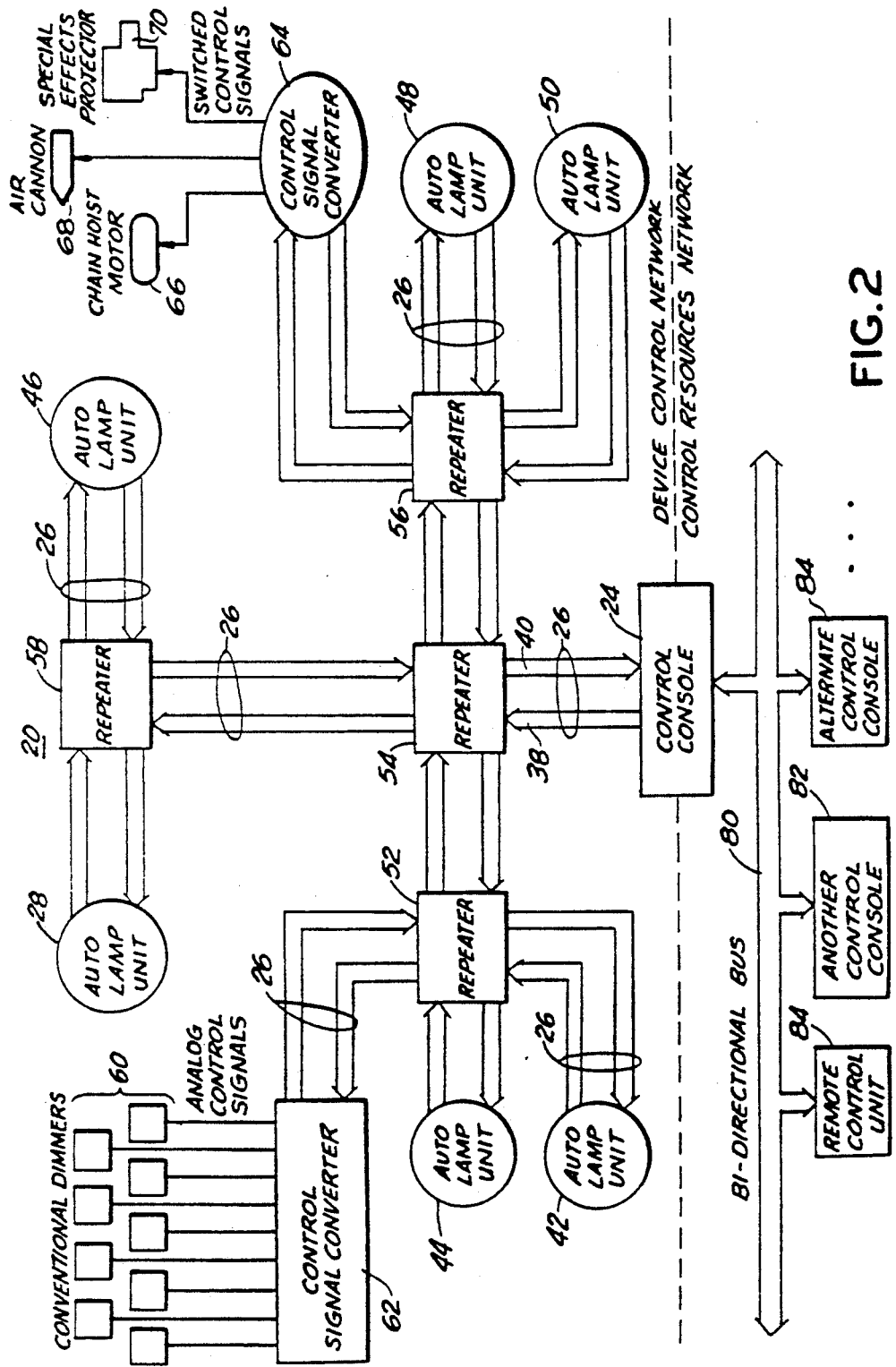
FIG. 2 is a block diagram of the lighting system of the present invention, which illustrates the communication between the control console and the various lamp units as well as other items of stage equipment.

A functional block diagram of the system 20 as it is utilized to control a plurality of items of stage equipment is shown in FIG. 2. The control console 24 is connected to operate through the data link 26 for controlling a plurality of items of stage equipment. The data link 26 includes bidirectional paths 38 and 40. Path 38 of data link 26 provides data communications between the control console 24 and each of the lamp units and other units within the system 20. The path 40 provides data communication from each of the lamp units in the system 20 back to the control console 24.

In addition to the lamp unit 28, additional lamp units 42-50 are shown in FIG. 2.

The data link 26 extends to cover a considerable area in the region of the stage 22. To maintain the integrity of the electrical commands that are transmitted through link 26, there are provided a group of repeaters 52, 54, 56 and 58. The repeaters 52-58, which are further described in detail below, provide amplification and isolation for the data transmitted through the data link 26.

The control console 24 serves not only to control the automatic lamps, such as 28, but can also be used to control a plurality of conventional dimmers such as set 60. The data link 26 is connected to a control signal converter 62 which transforms the digital signals received through the link 26 into analog control signals for directing the operation of the dimmers within set 60.

The control console 24 can also be used to control a plurality of conventional color changer mechanisms 34, such as gel scrollers, affixed to conventional lamps 30. The data link 26 is connected to a control signal converter 63 which, like converter 62, transforms the digital signals received through the link 26 into analog control signals for directing the operation of color changers 34. Converter 63, however, is programmed to store intensity and color parameters for each control channel, and is further programmed to produce at least two analog control voltage outputs for each logical control channel, one such output being applied to one of the conventional dimmers 60 and another output being applied to a corresponding one of color changers 34.

This arrangement simplifies programming of the lighting system, since an operator can specify intensity and color parameters of a suitably equipped lamp unit by selecting a single control channel. Also, by logically separating color controlling outputs from intensity controlling outputs of the control signal converter 63, the converter can be programmed to maintain the position of the color changer mechanism while fading-out the intensity of the conventional lamp units. This eliminates the annoying effect of colors changing while fading-out the system with the Grand Master fader.

The repeaters 52-58 serve to expand the connections to the data link 26. This is termed "fan out".

Other stage action effects may additionally be controlled by the console 24. For example, the data link 26 can be connected to a control signal converter 64 from the repeater 56. Converter 64 can produce control signals for directing the operation of a chain hoist motor 66, an air cannon 68 and a special effects projector 70.

The control console 24 serves as an interface to the collection of stage devices which are subject to control. These stage devices and the associated control are termed a "Device Control Network". The control function is provided by a plurality of units which include the console 24. This group of control units is termed the "Control Resources Network". This network includes a bidirectional bus 80 which provides data communication between the control console 24 as well as additional or alternate control consoles such as 82 and 84. The direction of the system 20 can further be effected at a remote location by operation through a remote control unit 84 which is also connected to the bidirectional bus 80.

Figure 3:
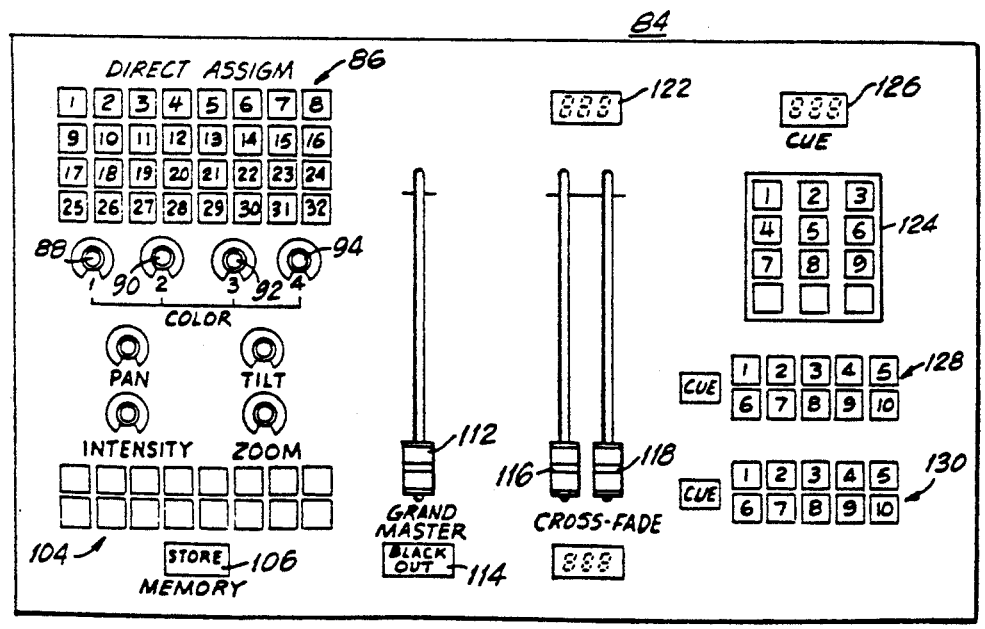
FIG. 3 is an illustration of the front panel for the control console for the present lighting system.

A front panel 84 for the control console 24 is illustrated in FIG. 3. The panel 84 serves to directly control each of the automated lamps, such as lamp unit 28, or to provide automatic control for all of the lamp units. The panel 84 includes a group of key switches 86 which provides direct assignment of cue numbers for particular lighting setups. A group of rotary controls 88, 90, 92 and 94 provide color selection for a particular lamp unit or group of lamp units. Rotary controls 96, 98, 100 and 102 provide respective control of pan, tilt, intensity and zoom for each of the lamps. A group of key switches 104 provide function of preset color selection. A particular lighting cue is entered into a console memory by operation of a store switch 106.

A grand master fade control 112 provides overall fading effects for all of the system 20 lights at one time. A black-out switch 114 turns off all lamps at one time. Cross faders 116 and 118 provide relative intensity control during a transfer from one cue to the next. The numbers of the cues involved in such a transfer are shown by indicators 120 and 122. Cue numbers are entered at the console 24 through a key pad 124. An "S" key is provided for storing a cue while an "E" key is provided for entry of a new cue. The current cue, which has been entered at the key pad, is shown by an indicator 126. A group of key switches 128 provide for the entry of cue numbers for a first cue. A group of key switches 130 provide entry of a cue number for a second cue.

The control panel 84 can take many forms provided that it allows for direct manual control of the lamp units as well as for storing and recalling of cues for the system 20.

Figure 4:
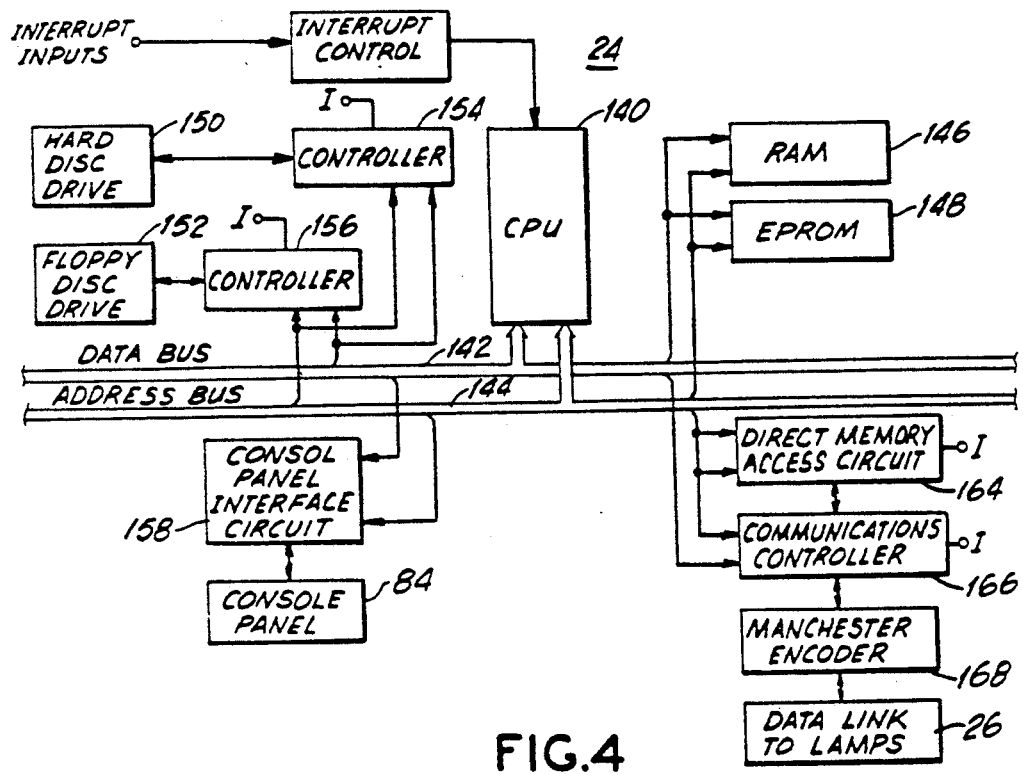
FIG. 4 is a block diagram for the electronic subsystems which are a part of the control console.

An electrical block diagram for the console 24 is illustrated in FIG. 4. The overall control of the console 24 is carried out by a central processing unit (CPU) 140. A representative microprocessor for use as the CPU 140 is a model 68000 manufactured by Motorola. The CPU 140 is connected to a data bus 142 and an address bus 144. The control console 24 is provided with random access memory (RAM) 146 and electronically programmable read only memory (EPROM) 148. Both of the memories 146 and 148 are connected to the data bus 142 and the address bus 144. The CPU 140, as well as other elements of the console 24, can both write to and read from the memories 146 and 148.

A hard disk drive 150 is provided in the console 24 for bulk storage of programs and data. There is further provided a floppy disk drive 152 for reading and writing conventional floppy diskettes. A controller 154 is connected to operate the hard disk drive 150 and is connected to the remainder of the circuit of console 24 through the data bus 142 and address bus 144. Likewise a floppy disk drive controller 156 is connected to operate the floppy disk drive 152 and is further connected to the data bus 142 and the address bus 144.

The console panel 84, that is, the switches, lights, optical encoders, potentiometers and alpha-numeric displays thereon, is accessed through a console panel interface circuitry 158 which is connected both to the console panel 84 and to the data bus 142 and address bus 144.

Communication with the automated lamp units is carried out by use of a direct memory access circuit 164, a communications controller 166 and a Manchester encoder 168. The data bus 142 and address bus 144 are both connected to the direct memory access circuit 164 and the communications controller 166. Communication is also provided between circuit 164 and controller 166. The Manchester encoder 164 bi-directionally communicates with the communications controller 166 and also transmits and receives data to and from the data link 26.

Figure 6:
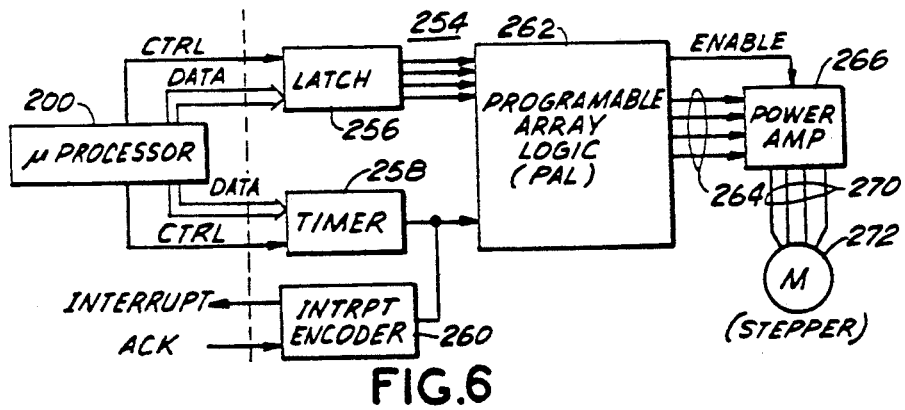
FIG. 6 is a block diagram illustrating a lamp unit stepper control system.
Figure 7:
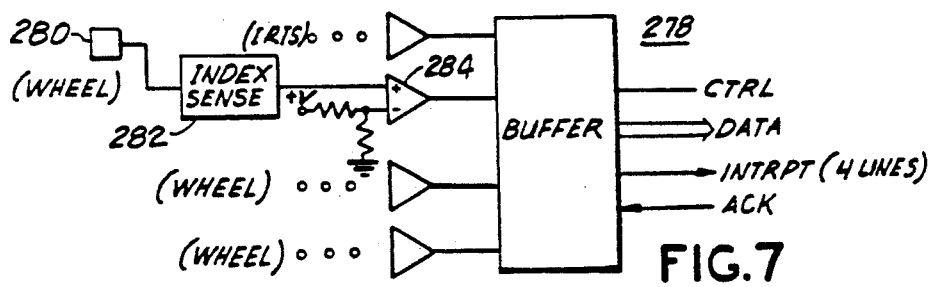
FIG. 7 is a block diagram illustrating an index sensor system for use with the stepper motors in a lamp unit.
Figure 8:
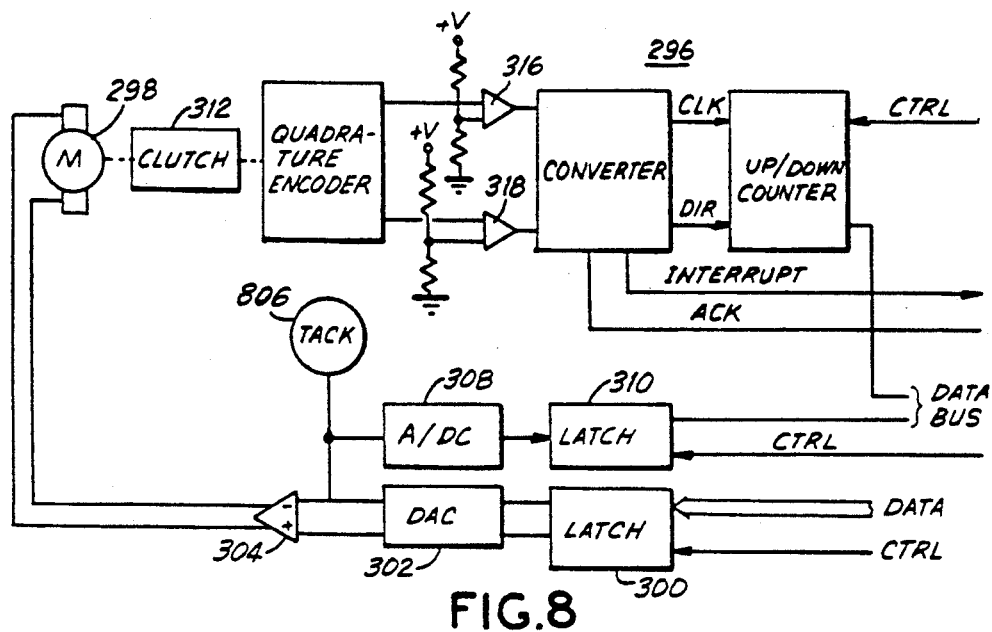
FIG. 8 is a block diagram illustrating servo feedback control of a motor within a lamp unit including rate of movement control and position monitoring.

FIGS. 5, 6, 7 and 8 are block diagrams illustrating the electronics in a lamp unit of the present invention. FIG. 5 specifically shows the lamp processor, memory and associated components. FIGS. 6, 7 and 8 are block diagrams showing circuitry that specifically drives particular parameters of the light beam in a light unit.

Referring now to FIG. 5, there is shown a lamp processor system 178. The data link 26 has the transmit and receive lines thereof connected through respective amplifiers 180 and 182. The transmit and receive lines of the data link 26 are connected through a switch 184 which is operated by a solenoid 186 that is driven by an amplifier 188. The switch 184 provides a "loop back" capability for making a direct connection between the transmit and receive lines in the data link 26 such that the lamp unit processor can perform self-testing without the use of the data link 26. The transmit and receive lines of the data link 26 are input into an encoder/decoder 190. (Harris Semiconductor Products Division Model HD-6409). The encoder/decoder 190 is connected to a lamp unit address bus 192 and a lamp unit data bus 194.

The lamp processor system 178 includes a microprocessor 200 which directs the overall functioning within the lamp unit and specifically generates the commands which drive the mechanisms for controlling the parameters of the light unit. Microprocessor 200 is preferably a Motorola Model 68000. These parameters include pan, tilt, intensity, color and beam size. The microprocessor 200 is connected to the address bus 192 and the data bus 194. The lamp processor system 178 further includes a RAM and EPROM memory 202. The programs for driving the various parameters to the desired states and the cues for determining what these states shall be are stored in this memory. The microprocessor 200 is further connected to receive interrupts and send acknowledgements through an interrupt encoder/acknowledge circuit 204 (Motorola Model 68230) by use of an acknowledge bus 206 and an interrupt bus 208.

Interface and timing of the various circuit elements within the lamp processor system 178 is provided by an interface and timing circuit 210 (Advanced Monolithics Model 9513). The identity of a particular lamp unit is determined by a thumb wheel setting which is included in a lamp unit identity circuit 212. This identity is input to the interface and timer circuit 210. A bulb power supply 214 has various interrupt and acknowledge states which are also transmitted to the interface and timer circuit 210. The microprocessor 200 generates a series of control signals which are transmitted through a bus 216 to a decoder 218. The output from the decoder 218 comprises a group of control signals which are directed to a decoder 220 and further distributed as control commands throughout many of the circuits in the lamp processor system 178. A group of control signals are produced by the decoder 220 and transferred as control signals to the specific control circuits shown in FIGS. 6, 7 and 8.

The data transmitted through the data bus 194 is provided to a buffer 228 which in turn transfers the data to the various parameters control circuits shown in FIGS. 6, 7 and 8.

The interrupt and acknowledge signals on lines 206, 208 are provided to a vector generator 230 which generates corresponding vector states that are transmitted through a bus 232 for transmission through data lines to the parameter control circuits shown in FIGS. 6, 7 and 8.

The interrupt signals produced on line 208 are further provided as interrupt signals to the parameter control circuits in FIGS. 6, 7 and 8. Likewise, the acknowledge signals produced by the parameter control circuits in FIGS. 6, 7 and 8 are transmitted through bus 206 to the interrupt encoder/acknowledge circuit 204.

The data bus 194 is further connected to a buffer 238 which transmits the data to both a direct memory access circuit 240 (Motorola Model 68440) and to the input of a buffer 242. The output of the buffer 242 is provided to the address bus 192. Handshake control signals are passed between the DMA controller 240 and the multiprotocol controller 246 to synchronize the high speed communication of data to and from the microprocessor 200.

A control bus 244 serves as a bidirectional connection between the direct memory access circuit 240 and a multi-protocol communication controller 246. (Rockwell International Corp. Model 68561). The encoder/decoder 190 provides received data and received clock to the controller 246. Transmit data and transmit clock are passed from the controller 246 to the encoder/decoder 190. Various control signals are exchanged between the controller 246 and the encoder/decoder 190.

In the event an interrupt generating event occurs, the multiprotocol controller 246 asserts an interrupt output directed to the microprocessor 200. In response to an interrupt acknowledgement from the microprocessor 200, the controller 246 places interrupt vectors on the data bus 194. In a conventional manner, the microprocessor 200 temporarily interrupts processing to service the interrupt.

The multiprotocol controller 246 has serial data transmit and receive inputs in addition to a parallel system data input. The multiprotocol controller 246 of the type identified is capable of DMA data transfers up to a rate of 2 megabits per second. The high speed data stream of this nature permits the downloading of the substantial light unit cue information in a very short period of time.

The encoder/decoder 190 operates in conjunction with the communications controller 166, shown in FIG. 4, to convert the format or protocol of the data transmitted serially through the control processor 24 into a format acceptable by the lamp processor circuit 178.

Lamp processor system 178 includes a network of clock, control and power lines (not shown) which are routinely required for the operation of a microprocessor circuit.

The lamp processor system 178 serves to initialize the entire lamp unit, command the operation of the parameter control circuits in response to manual input commands from the console or from stored cues, transfer stored cues from the memory 202 back to the control console for storage, and respond to broadcast commands received through the data link 26 for recalling cues from the memory 202 for commanding the operation of the parameter control circuits, which are shown in FIGS. 6, 7 and 8.

Referring now to FIG. 6 there is shown a parameter drive circuit 254 which serves to operate stepper motors that are used within a lamp unit. Such a stepper motor is used, for example, for selecting color, determining iris size and selecting a gobo pattern. The microprocessor 200 has control and data paths, which are described in FIG. 5 that are connected to a latch 256 and a timer 258. The interrupt and acknowledge lines noted in FIG. 5 are further provided to an interrupt encoder circuit 260. The data captured by the latch 256 is transferred through a plurality of lines to a programmable array logic (PAL) 262. The PAL 262 produces a combination of control commands that are sent through a cable 264 and an enable line to a power amplifier 266. The amplifier 266 generates a series of power signals which are transmitted through a group of lines 270 to a stepper motor 272. The power signals on lines 270 cause the motor 272 to move, in a sequence of steps to a desired angular position.

The timer 258 produces timing signals required for the operation of the stepper motor. These timing signals are provided to both the interrupt encoder circuit 260 and the PAL 262. Thus, when it is required that a stepper motor change position, the microprocessor 200 produces a control command that is sent as data to the latch 254. The latched data is then transferred into the PAL 262 which converts it into control signals that are amplified by the amplifier 266 and provided to the stepper motor 272. When each operation required of the stepper motor has been carried out, an appropriate interrupt or acknowledge command is transmitted through the circuit 260 back to the microprocessor 200.

A further parameter control circuit 278 is shown in FIG. 7. The circuit 278 is used with mechanical control parameter units which require position sensing. For the present embodiment the circuit 278 is used to control three wheels and one iris. Each of the wheels and iris has a sensor. An example is presented for operation of a wheel, such as a color wheel, by a stepper motor. The wheel includes a mark, or magnet which is detected by a sensor 280 which is operated by an index sense circuit 282. The detected index is provided to the noninverting input of an amplifier 284. A fixed reference voltage is provided to the inverting input by operation of resistors 286 and 288. The output from the amplifier 284 is provided to a buffer 290. The output of the buffer provides address control, data, and interrupts for each of the parameter circuits to the microprocessor 200. An acknowledgement of each interrupt is provided to the buffer 290.

Referring now to FIG. 8 there is shown a parameter control circuit 296 which provides drive and feedback control for parameters such as pan and tilt. The data bus from the microprocessor 200, as shown in FIG. 4, provides both position and rate of change feedback and rate of change command data for a servo motor 298. The speed control data is input to a latch 300 which outputs the data to a digital to analog converter 302 which produces an analog signal that is input to the noninverting terminal of a driver amplifier 304. The driving terminals of amplifier 304 are connected to the terminals of motor 298. A tachometer 306 monitors the speed of motor 298 and provides a corresponding analog signal to the inverting input of amplifier 304. Thus, there is provided a feedback loop for determining the rate of rotation of the motor 298. The angular speed information is further transmitted to an analog to digital converter 308 which provides the digital form of the speed information to a latch 310. The output from latch 310 is provided as a data signal back to the microprocessor 200.

The motor 298 is physically connected through a clutch 312 to a quadarture encoder 314. The two outputs from the encoder 314 ar provided respectively to first inputs of amplifiers 316 and 318. The second inputs of these amplifiers are set to reference values by operation of resistors connected between the power supply and ground. The outputs from the amplifiers 316 and 318 are provided to a converter 320 which transforms the analog position signals into digital signals which are transmitted through a clock line and a direction of rotation line to an up/down counter 322. The output from the counter 322 is an indication of the position of the motor 298 and is transmitted through the data bus back to the microprocessor 200. The converter 320 further serves to produce an interrupt signal and to receive an acknowledge signal which are exchanged with the microprocessor 200.

Figure 9:
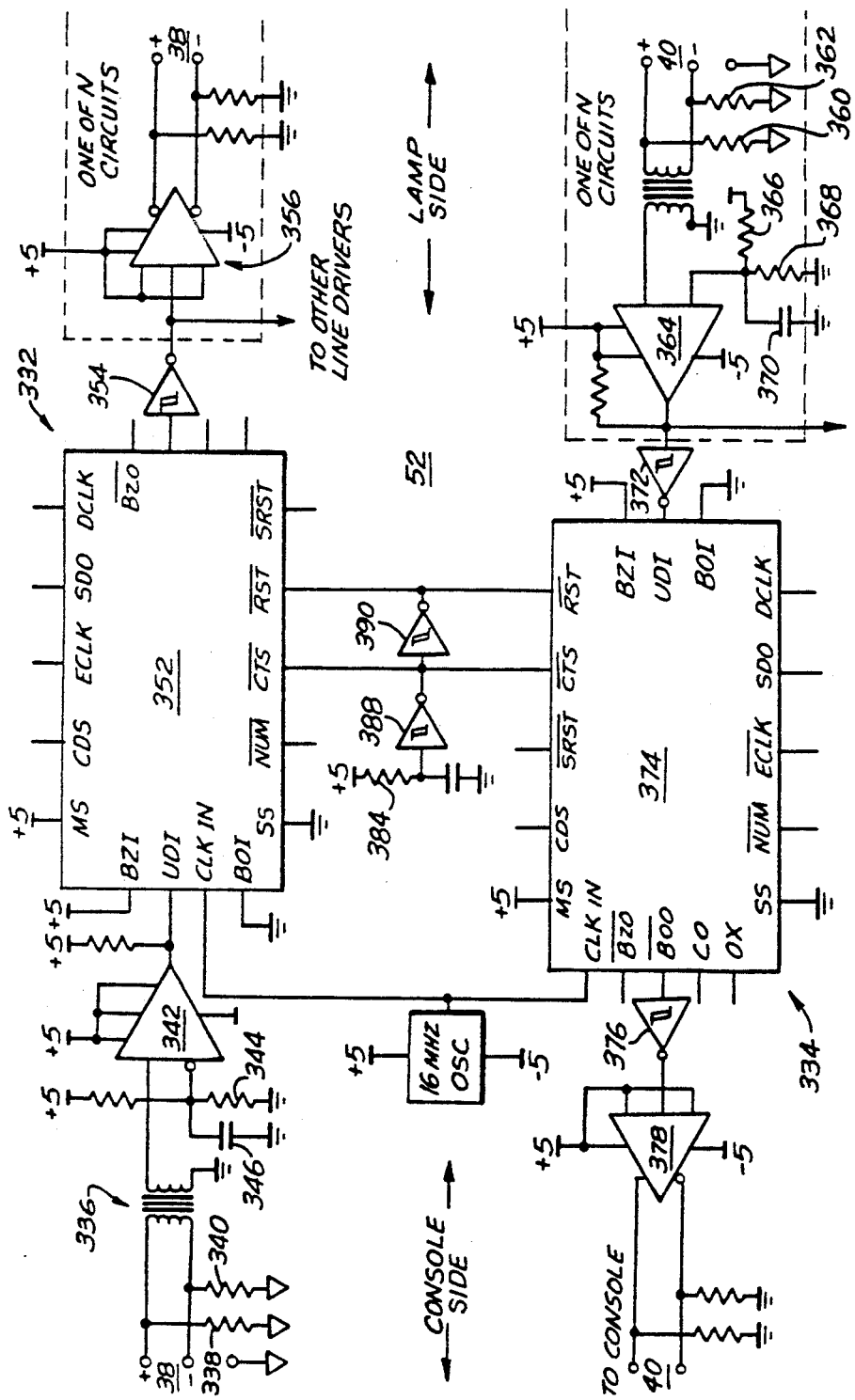
FIG. 9 is a detailed schematic diagram for a repeater a shown in FIG. 2.

The repeater 52, which is similar to each of the repeaters shown in FIG. 2, is described in further detail in FIG. 9. The purpose of the repeater 52 is to provide high speed data transmission between the lamp units, as well as other controlled stage devices, and the control console 24. The repeater 52 is connected serially with the data link 26. The repeater 52 provides bidirectional communication for the paths 38 and 40. The lamp units and the consoles can each be considered to be both a source and a destination. The description of the repeater 52 is made in reference to the control console being a source and the lamp units being destinations.

The repeater 52 is designed to handle high speed data transmission through the paths 38 and 40 which are preferably 50 ohm transmission lines. Repeater 52 has a transmitter section 332, the upper portion shown in FIG. 9, and a receiver section 334 which is shown in the lower portion of FIG. 9.

The data link path 38 is connected to the input terminals of a transformer 336. Resistors 338 and 340 are connected respectively between the two conductors of path 38 and ground. Further, the data link path 38 is provided with a shield which is also grounded. The secondary of transformer 336 is connected to the noninverting input of an amplifier 342. The inverting input is connected between biasing resistors 342 and 344. A capacitor 346 is further connected between the inverting input of amplifier 342 and ground.

The output of amplifier 342 is connected to the input of a Manchester encoder circuit 352. The output from the Manchester encoder circuit 352 is passed through an invertor 354 to one or more differential current line drivers. The output of invertor 354 is connected to one such line driver 356. The output from the line driver 356 is further connected into the path 38 for transmission to another repeater, such as 52, or to an ultimate destination such as a lamp unit.

In the receiver section 334, the path 40 is connected to the primary terminals of a transformer 358. Resistors 360 and 362 are connected between the conductor lines of path 40 to ground. Again, the shield of link 40 is grounded. The secondary of transformer 358 is connected to one input of an amplifier 364. The second input of amplifier 364 is connected to the junction of resistors 366 and 368. A capacitor 370 is connected between the junction of resistors 366 and 368 and ground.

The output signal from the amplifier 364 is passed through an invertor 372 to the input of a Manchester encoder 374. The output from encoder 374 is further passed through an invertor 376 to the input of a differential line driver 378. The outputs from line driver 378 are connected to drive the differential terminals of path 40 of data link 26. The path 40 is directed to the control console 24 or to the receiver section of a further repeater, such as repeater 52. The Manchester encoders 352 and 374 are driven by an oscillator 382 which provides inputs at a clock rate of 16 mHz. The repeater 52 further includes a startup circuit which comprises a series combination of a resistor 384 and a capacitor 386. These series components are connected between the positive voltage supply and ground. An invertor 388 has the input thereof connected to the junction of resistor 384 and capacitor 386. The output of invertor 388 is connected to the CTS inputs of encoders 352 and 374. The output of invertor 388 is further connected to the input of an invertor 390 which has the output thereof connected to the reset inputs of the encoders 352 and 374. At power-up, the reset signals to the encoders 352 and 374 are at an initial low logic level for a short period of time. When the capacitor 386 is charged, the reset logic state changes and goes to a high logic level for normal operation. Thus, the digital circuits the Manchester encoders are set to predefined states when power is initially applied.

In a selected embodiment of the present invention, the Manchester encoder/decoders, such as 352 and 374 as well as encoder 168 shown in FIG. 4, comprise an integrated circuit model HD-6409 manufactured by Harris Semiconductors Products Division. The Manchester encoders 352 and 374 have the mode select input connected to a logic high level thereby selecting the repeater mode. The Manchester circuit operates by receiving the high speed data stream for conversion into the nonreturn to zero (NRZ) form. The clock signal is recovered from the data stream in a conventional manner. The data stream is then retimed and reconstructed before being output to the invertor. In this manner any distortion in the nature of pulse width, delay or otherwise is not compounded through the transmission in the data link. The reconstruction and retiming of the high speed data stream at each repeater serves to significantly reduce the data error rate through the data link 26.

In accordance with a primary feature of the invention, there is provided a decentralized control over the operation of each lamp unit. By this it is meant that high level commands are dispatched by the console processor to the lamp units. This is termed a "broadcast command." Each lamp processor responds in an appropriate manner defined by the program and previous condition at that particular lamp processor. This is in contrast with prior art systems wherein the console processor stores all of the current information and data concerning the status of each lamp unit and each parameter within each lamp unit. In these prior art systems, all the cue storage of data information has been handled completely by the console processor itself, and the only data that was transmitted to the pertinent lamp units were the very detailed instructions, such as the number of pulses necessary to rotate a particular stepper motor a desired number of degrees. This is to be distinguished from the system according to the present invention which is configured such that the console reads its control inputs, and upon sensing a change does minimal processing of the changed input (such as providing the ordinal number of a switch or the identifier of a fader) and transmits this change signal to all lamps units simultaneously, in a single high level message. Each lamp unit then recognizes the intended effect of this change and calculates the desired response within its own processor. In processing a high level command, each lamp unit processor requires no interaction with the other lamp units, or with the console. For example, a single message that a fader on a console has been moved is transmitted to all the lamp units simultaneously. Each lamp unit processor recalculates the balance of the recalled cue information based on the individual involvement with the cue. Various lamp units may have different actions for one cue, some lamp units may not be active at all. With this new configuration, all cue memory for instantaneous recall is maintained in each individual lamp unit memory. Each lamp unit thus has available all cue information within the unit itself. However, for backup and long-term or secondary storage, the console processor maintains a copy of the cue data for each lamp unit. This backup is maintained on a disk storage and is read into the memories of the lamp unit upon system initialization at lamp replacement or for a complete memory change over.

It can be seen from the foregoing that the efficiency and reliability of the system has improved since the large body of cue data is transmitted through the narrow band-width communications link only once, namely, at system initialization. Thereafter, the cue data is available within each lamp unit, where the reading and writing thereof is performed in the environment of the high band-width local memory. It is seen from the foregoing that the efficiency of the system is optimized, especially in situations where there is a concurrency of activity of each lamp unit in response to a newly generated command. The command from the console is simply transmitted to each of the lamp units in a system-wide manner as a broadcast command in one transmission. The activity required in each lamp unit is carried out independently of the activity in other lamp units, and without further data transmissions from the console. This results in a considerable saving of time and enhancement of reliability. This is due to the parallelism in the data link transmission. Moreover, the addition of more lamp units to the system does not significantly burden the console processor nor the data link. The system is always maintained in an optimum manner upon the addition of lamp units since each lamp unit adds the necessary processing power and memory required for carrying out its function. Very little additional load is added to the work of the console processor when a lamp unit is added to the system.

Figure 10:
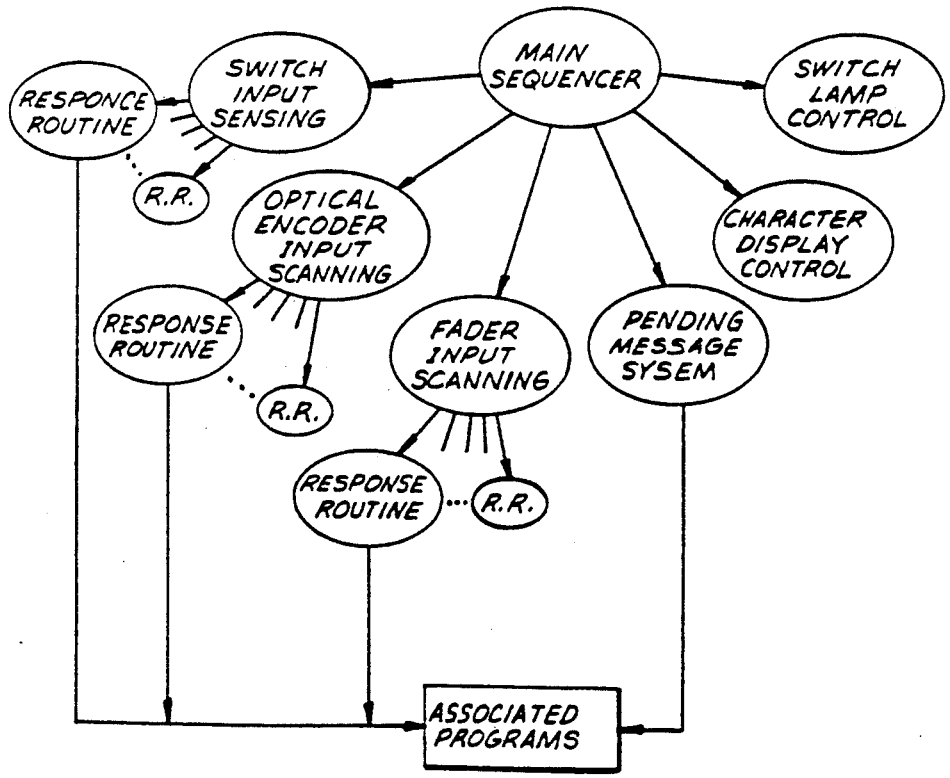
FIG. 10 is a flow diagram illustrating the operation of programs in the control console which includes a main sequencer that steps through a number of sensing, communication and other operational control programs.

With the foregoing in mind, the console will be described next in connection with the functions of the processor system. FIG. 10 depicts the primary functions of the console processor complex in flow chart form. On initial power up of the console, the console circuitry is initialized with predetermined internal variables, whereupon the processor enters the main sequencer program. This program is in the nature of an endless loop which branches out to other subsidiary programs in a predefined and unvarying sequence. When each subsidiary program is entered in the sequence, it performs a specific function before returning to the main sequencer loop.

One of the subsidiary programs of the console is the switch input sensing program. This program performs a complete scan of all the console switches appearing on the front panel thereof. The depression or release of any switch is sensed by the processor complex, whereupon the appropriate response routine is activated for each switch in which a depression or release was sensed. The status of each newly activated switch is transferred to the response routine.

The switch input sensing response routines are individual scripts which specify actions to be taken when a certain switch is pressed or released. Some switches are functionally grouped together and therefore employ the same response routine. In this event, the number of the switch within the common group is identified during the response routine, in which the number is used as a switch identifier in the script which is common to all switches in the group. Examples will be described below.

A second subsidiary program which the console processor enters in the sequence, is the optical encoder input scanning program. As noted above, the rotary location of various console devices are determined, and acted upon accordingly. The rotary input devices on the console front panel comprise optical encoder/hardware counter circuits of conventional design. The optical encoder input scanning program is operable to read the counter values for each encoder, and compare the new value to the value which was stored in accordance with the previous scan. If the comparison indicates a change in the position of the rotary device, the identifier for that encoder is combined with the amount by which the value has changed, the result being sent as a command message via the network to all lamp units. The lamp units individually determine whether the change in the rotary status of the console device requires a response in the particular lamp unit.

A fader input scanning subsidiary routine appears as the third routine encountered by the main sequencer.

This routine responds to the change of position of the slider fader control devices appearing on the console panel. The faders are essentially resistive potentiometers, and the sensing of the linear motion thereof is accomplished by analog to digital converters. In this manner, when the fader position is changed, a new digital encoded number will be provided at the output of the sensing circuit. It is understood that other sensing circuits can be used with equal effectiveness. The fader input scanning program reads the current input value of each fader sensor circuit, and responds only if the value has changed from the value previously stored. As with the optical encoder input scanning program, if the sensing of the fader shows a new position, the fader identifier is combined with the actual value read from the fader, and the information is sent via the network to all lamp units as part of a command message. The lamp units each determine the applicability of the new fader value based upon the fader identifier and the lamp unit's internal state.

A pending message manager subsidiary program comprises an additional program entered in the sequence by the main sequencer. In certain circumstances, the console switches can be activated by the operator faster than the corresponding messages can be transmitted in accordance with their respective response routines. Therefore, if a response routine finds that a previous message has not been transmitted to the network by the console processor complex, a pending message packet will be generated by the respective response routine. This packet is sent when the previous message has been completed and transmitted. The pending message manager subsidiary program scans the various subsidiary programs for the existence of any pending message packets, and also scans if associated previous messages have been transmitted. A command message corresponding to a pending message packet is then dispatched by the pending message manager, when a scan finds that a previous message has been completed.

A character display control subsidiary program is entered by the main sequencer for servicing alphanumeric display devices on the console front panel. Several of the switch input response routines control the displays. The character display control program provides a common control interface for the response routines. In addition, the character display control program translates display data from the format used by the console system into a sequence of commands for the alpha-numeric display devices.

Lastly, there is provided a switch lamp control subsidiary program. This program controls the lamps in the various switches to indicate to the operator whether the switch is in a depressed state or a released state. In this manner, and in contrast to prior console switch systems, electrical switch contacts for carrying lamp power are not required. This has a substantial effect on increasing the reliability of the many console switches. The lamp on and off data sent by the switch lamp control program is placed into the console processor complex memory by the response routines. Retrieval of the data by the switch lamp control program is also necessary for comparing with the newest scan to determine if the lamps associated with newly depressed switches should be illuminated or extinguished.

Also shown in FIG. 10 with the subsidiary programs is a block indicating associated programs. These associated programs are enterable by various routines of the subsidiary programs. More particularly, these associated programs are entered on the occurrence of certain hardware interrupts generated by the console electrical apparatus. Each associated program is a consolidated set of routines which provides control of various hardware functions, data structure or aspect of the console's logic state. One such associated program comprises the communications manager program. The primary function of the communications manager program is to control the transmission network between the console and the plural lamp units. The coordinated transmission of data to the network demanded by the various response routines is important to assure an orderly flow of information in accordance with the urgency of demands imposed by the respective response routines. The parallel nature of the transmission network is highly desirable insofar as a failure of one lamp unit does not affect the transmission capability of the other lamp units. This is in contrast with the "daisy- chained" or serially connected networks typically employed. As noted above, the communication path between the console and the lamp units are full duplex paths, i.e. a transmit and receive path on which independent and simultaneous data transmissions may occur. The communications manager program has control of the lamp units and the data transmitters located therein, thus can insure that only one lamp unit, at any one time, is using the network transmission path. In accordance with the communications manager program, there are provided two types of message addresses; namely, individual lamp addresses and the broadcast address. Each lamp unit of the system is individually accessible by the console processor complex by transmitting the unique address associated with the particular lamp unit. As noted above, each lamp unit connected to the network will receive the lamp address; however, only the address transmitted will respond. On the other hand, the broadcast address includes a lamp address field with a special value to which all lamp units in the network respond. Moreover, each lamp unit responds to the broadcast address irrespective of their individual lamp addresses.

The console utilizes broadcast messages and individual lamp unit messages for two different categories of command messages. Messages to individual lamp units are used solely for maintaining cue data on the storage disk, for reporting the status of each lamp unit and for responding to lamp units newly connected to the network. All other functions of the system are carried out by the broadcast messages. Broadcast messages, for example, are transmitted to the lamp units for placing them or removing them from manual control. Manual control of the lamp units is established by broadcasting the change command message and allowing the lamp units to respond. In addition, cue information data is recalled by the console processor complex from the units by broadcasting the cue number and allowing each lamp unit to determine whether the cue is applicable. Once the entire system has been initialized, all functions needed of the lamp units during the course of the performance are in the nature of broadcast messages. With the architecture, the performance of a show is not impaired by the failure of one lamp unit which would cause it to continually transmit data, thereby tying up one half of the duplex network directed from the units to the console. The other half of the duplex transmission line of the network, that portion extending from the console to the lamp units, thus remains operative for transmission of console information to the units. As a result, each unit can react to the change of status of the console switches, dimmers, rotary encoders, etc. The receipt by a lamp unit of a message transmitted specifically thereto, is acknowledged by a transmission from the lamp unit to the console. In the event a response is not received from the lamp unit, the communications manager will retransmit the command message. This retransmission negates the effect of any faulty transmission by the lamp unit because of noise or other problems. However, the lack of a response from the lamp unit after several retransmissions by the console processor complex is taken as an indication that the lamp unit is no longer operational. Selected messages transmitted by the lamp units will involve the transmission of data to the console. In a comparable manner, this transmission may be retransmitted by the communications manager of the lamp unit processor complex, should a simple reply by the console processor in response to the first transmission not be received. In the event of a more severe network transmission line problem, the console transmits broadcast message at most three times to ensure the reception over a noisy communications line of at least one such message. Transmitted along with the broadcast message are sequence numbers which correspond to the number of times a message has been transmitted. The communications manager programs of the various lamp units disregard subsequent repetitious console transmissions by the use of the sequence numbers. The communications manager program within the control complex receives console message in accordance with the various console programs, and enqueues such messages for transmission to the lamp units. If a particular message requires a reply from a lamp unit, the console processor will wait for the reply and, when received, pass it back to the program initiating the message before transmitting subsequent messages.

Figure 11:
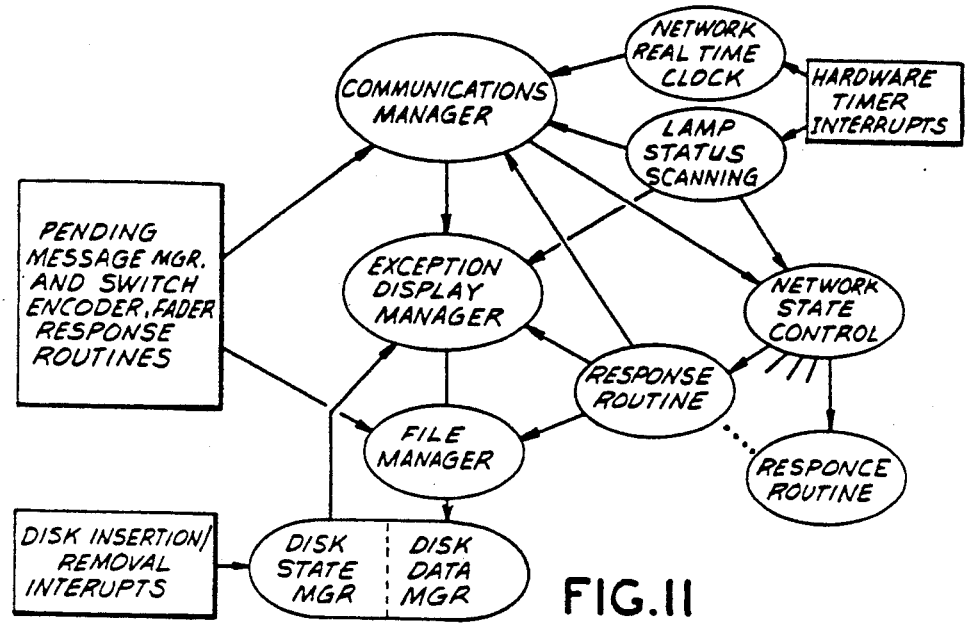
FIG. 11 is a flow diagram of additional programs utilized in the control console for carrying out the operation of the lighting system of the present invention.

Shown in FIG. 11, which illustrates the associated programs, is a file manager program. The file manager program oversees the disk file system, and provides sequential, relative record and key indexed files for the lamp unit cue data. The cue data associated with each unit lamp is identified by a file identifier which includes the console control channel to which the unit is assigned. Programmed console data is also stored on the disk by files, one for each programmable console function. In all other respects, the file manager operates in a conventional manner. The associated programs in the figure also include a disk data manager program. In a conventional manner, the disk data manager provides the functions of managing the list of free sectors in the disk, allocating the sectors to various files, and locating a desired sector of a file and issuing the disk hardware signals necessary to execute appropriate actions. This program requires modification to control the different disk drives employed in various implementations of the invention. Another associated program is shown in the figure as the exception display manager program. The exception display program usurps command of one of the alpha-numeric display devices located on the front panel of the console for drawing attention thereto of the operator. These situations generally arise during operation of the console where the operators acknowledgement or assistance is required to resolve a problem. A script of display data for display on the alpha-numeric devices is provided to assist the operator. The displayed data may include expected switch input responses which require activation. Once the problem has been resolved, control of the alpha-numeric display device is returned to the character display program.

The network state control program maintains management over the connection or disconnection of lamp units to the network. When a lamp unit connection is first detected by the communications manager program, the network state control program is signaled, in which event a sequence of checks is instituted on various status bits reported from the newly connected lamp unit. These bits represent certain conditions and actions which are prerequisites of the console to recognize a fully operational lamp unit. Response routines are provided for each of these status bits. The response routines specify actions for the console to take, based upon appearance of the respective bits. Examples of some of the functions performed by the network state control program are the downloading of additional lamp unit program code, the downloading of cue data for the lamp unit and the transmission of packets of data describing the current state of various console front panel controls.

The disk state manager program monitors the insertion or removal of disks from the disk drives. A console processor interrupt is generated on the insertion or removal of disks. Because of the importance of maintaining updated cue information on the disk, it is of paramount importance to the operators of the console that notification is given of situations which prohibit copies of the lamp cue data from being updated on the disk. Notification of such malfunction is brought to the attention of the console operator through the exception display manager program. Such situations may occur when the proper combination of disks is not present in the disk drives.

In accordance with the invention, there is provided a network real-time clock program which is operative to broadcast, on a regular basis, a real- time clock information to the lamp units. The real- time clock information comprises date and time data information. This data originates from a battery powered integrated circuit in the console circuitry, and is sent to the lamp units by way of the communications manager program. The network real- time clock program is activated by a hardware interrupt.

During the ordinary sequence of a production or show, the console regularly requests lamp status data from each lamp located on the console. Certain status bits, such as the cue-data-download request bit, cause activation of the network state control program. Other bits, such as the bulb failure bit, result in operator notification by way of the exception display manager as noted above. Still other bits are simply stored for later examination by the console operator. The lamp status scanning program is also activated by a hardware interrupt. In response to an interrupt, the status of a lamp is requested, and retrieved. Since the hardware timer producing the interrupts operates continuously, the console processor complex has available the most recent status information from all lamp units connected to the communications network.

The operations of the multiple controller network can be illustrated by referring again to FIG. 2 and FIG. 11. The bidirectional bus 80 provides data communication between and among the control console 24 and an alternate control console 84, another control console 82 and remote control units 84. In one implementation, bus 80 is electrically configured in the same way as the data link 26, and the control console 24 is provided with a communications manager program as described in the associated programs of FIG. 11. This program serves the same function of controlling activity over bus 80 that the communications manager serves in controlling activity over the data link 26.

Two types of message addresses are provided, individual console addresses and a system address, giving the same functionality as described in the descriptions for FIG. 11, e.g., individual console is individually accessible by the main console processor complex by transmitting the unique address associated with the particular console unit. In the system address command, all consoles connected to the network can respond.

Messages sent by the control console 24 to the system address contain information including the status data messages received from the lamp units, the state of the controls on the main control console and system status data processed and formatted by the main control console. These messages allow the additional and alternate consoles and remote control unit to produce the same displays as the main control console or to display different information.

Messages sent from the additional and alternate consoles and remote control unit to the main console are of two types. One type of message is of the same format as the messages sent by the main control console to the lamp units. These messages contain data identifying the console which originated the message. As previously described, some messages to the lamp units produce a response from the lamp unit. This response also contains the data identifying the originating console; this data permits the main control console to route the response to that originating console.

The second type of message sent from the additional and alternate consoles and remote control unit to the main console is a message to the main console itself. Some of these messages duplicate an action or sequence of actions performed by an operator manipulating the front-panel controls of the main console. These messages result in the main console sending to the lamp units the same messages that would have been sent had the controls physically been manipulated. Other messages cause the main console to modify the cue data and programmed console data which are stored in the lamp units and in the memory and on the disks of the main console.

An example of remote control unit 84 is a hand-held device which the lighting designer carries onto the stage to use for fine adjustments to the azimuth and elevation of the lamp units, ensuring that the light beam does (or does not) fall on a certain set piece or area of the stage. Another control console 82 could be a director's console, used by the lighting director during rehearsals to display data for cues other than the one currently being performed by the lamp units or to recall cues in the lamp units when the operator is away from the control console 24.

Another control 84 is a controller as disclosed in U.S. patent application Ser. No. 641,031, entitled "Creating and Controlling Lighting Designs". This controller provides controls which includes prerecorded commands and hands-free execution of a performance. The disclosure in application Ser. No. 641,031 is incorporated by reference herein.

Another controller 84 is a control device as disclosed in U.S. patent application Ser. No. 693,366, entitled "Improvements In High Intensity Light Projectors". Provisions from this controller includes commands in video format. The disclosure of application Ser. No. 693,366 is also incorporated by reference herein.

The alternate control console 84 could be located at a position which gives a more appropriate view of the stage for certain types of performances. The provision of this alternate console would prevent the necessity of moving the main control console 24 and its connection to data link 26.

Another member of the control resources network in communication with bus 80 and its connected controllers is a unit having storage and playback facilities to store, for example, the state of the settings of the master console 24 and to recall or "play" those settings or modifications thereof, during certain modes of operation.

Other implementations of bidirectional bus 80 are possible, including a Local Area Network and a point-to-point data link between the control console 24 and a single alternate control console. Additionally, the additional or alternative control consoles or remote control unit could be implemented on a general-purpose computer, rather than the purpose-built console.

The foregoing is illustrative of the various programs available to the console processor. The following is an example of the execution of various above-described programs in response to the depression of a certain "channel select" console button by the operator. The depression of this button is operative to bring a certain lamp unit under manual control, whereupon the rotation of yet another console knob is effective to rotate the lamp about one of its axes. In the following illustration it should be realized the effect of the decentralized control of removing console functions into the lamp units. Also it will be seen that with the provision of the present invention, there is a significant reduction in the processing required of the console, compared to conventional processor controlled light systems. The sharing of tasks between the console and lamp units also results in an increase in the speed to change a system parameter. In addition, in the disclosed embodiment, the console is no longer required to sequentially process a large amount of data for every lamp unit in the system. Instead, each lamp unit processor accomplishes the action required to achieve a change for that unit. Moreover, with the present system, the entire system can be changed in the time required by a single lamp unit. Also, because of the simultaneous transmission of messages to all lamp units, lamp units added to the system do not result in proportionately slower rate of transmission as was typical with prior systems. In accordance with the example for changing the position of a stage lamp under manual control, it is assumed that the console has performed the usual initialization routines. It is also assumed that the console processor has established communications with the lamp units, and has provided each lamp unit with all the data required for the respective initializations, and the system is operating in the endless loop of the main sequencer. In this loop, the main sequencer awaits input from the operator by way of the console devices. During its sequencing routine, the main sequencer calls the switch input sensing program which scans the switch input hardware of the console to produce a map of the switches appearing on the console front panel. In this map, set bits represent push buttons being pressed, and clear bits represent push buttons which are not depressed. This map is compared to a copy of a similar map in the memory which include the status of the switches as read on the previous scan. In comparing the present and previous maps, a third map is produced which indicates switches which have changed states between the generation of the first and second maps. If no changes are found, the program is returned to the main sequencer. Assuming that a change has occurred, the program scans the third map, bit by bit, to identify the changed switch and to activate the corresponding response routine. The identifier and new state of the newly activated switch is passed to the associated response routine. The newly operated switch is identified as a member of the "channel select" switch group, all of which are serviced by the same response routine. The switch identifier indicates the number of the switch within the "channel select" group which along with an additional group selector specifies the control channel to which the switch corresponds. All one thousand of the console control channels are each represented by a single bit in a console memory map, and indicates whether the channel is or is not selected for manual control. Because of the pressed switch, the value of the bit for its channel is inverted, thereby selecting the lamp for manual control. In the event the lamp is already under manual control, the depression of the switch would have the effect of removing the lamp of unit from manual control. Although only one bit in the noted map has been changed, the entire map is now broadcast to all lamps simultaneously. Each lamp examines the map and determines whether its control has been changed based upon the broadcast message. After transmission of this map throughout the network, no further processing is required of the console in response to the depression of the switch.

The response routine entered in response to the depression of the switch, calls the communications manager program with a command to send a broadcast type message. The broadcast message includes a pointer to the block of memory that holds the message data. The communications manager program either initiates the transmission of the data by programmable integrated circuits which implement the communications function, or in the alternative, if a communication is already in progress, the communications manager enqueues the command and memory pointer for subsequent transmission after the current message transmission is concluded. Any additional processing required by the communications process is performed as a response to console processor interrupts from the various programmable integrated circuits. No further processing is required of the communications manager program in connection with the switch activation.

When the communications manager program has accomplished the transmission of the message, or has enqueued the message for future transmission, it returns by way of the response routine program and switch input sensing program to the main sequencer. As a result, the main sequencer is entered in the endless loop at the position previously exited when the newly pressed switch was sensed. The main sequencer continues until the lamp button pressed for manual control is released. The switch input sensing program is again entered, whereupon a comparison of the scanning maps indicates a change in the switch state. The switch is again identified, as noted above, and the associated response routine is activated.

The response routine takes no action on the release of the switch. This is in contrast to other types of switches which cause activation of the response routine upon being pressed or released. In any event, return is made from the response routine through the switch input sensing program to the main sequencer. Again, the main sequencer resumes scanning within its endless loop. Departure is taken from the loop to the optical encoder input scanning program. The rotation of the appropriate console device by the operator is effective to cause a corresponding rotation of the appropriate stage lamp. Encoder/counter circuitry, as described above, provides a numerical input to the optical encoder input scanning program. The value produced by each encoder/counter circuit changes when the encoder shaft is turned by the operator. In a similar manner to the switch input sensing program, the optical encoder input scanning program compares the value read on each scan to the value stored in connection with the previous scan. In the event a difference is found during the comparison, an appropriate lamp command is generated. The message block includes the manual change lamp command, the amount of change, and the identifier for the particular encoder. The lamp command is then dispatched to the communications manager program as a broadcast message. All lamp units will receive the broadcast message and determine the applicability of the message to the particular lamp unit.

As noted previously, the communications manager program processes this message by immediate transmission, or by enqueueing the message for subsequent transmission when the communications channel is clear. The console program then returns to the endless loop of the main sequencer. The foregoing constitutes the participation by the console processor in effecting the change in the lamp position as specified by the operator. All additional and subsequent processing is accomplished by the individual lamp units, as required.

The next example for illustrating the principles of the invention relate to the storing of cue data information in a particular lamp unit processor memory. This function is initiated by the console operator by depressing the "store cue" switch. As with the previously described example, the main sequencer exits the endless loop, and enters the switch input sensing program. The switch input sensing program reads a new input map and compares it against the status of the system as stored in a previous map. Accordingly, the state of the "store cue" switch is found to have been pressed. The switch is then identified and the respective response routine is called.

The response routine appropriate to the "store cue" switch checks for two necessary conditions; that "store enable" switch is also currently being pressed, and that a cue number appears in the display window above the "store cue" switch. If these two conditions are met, then the console sends a store cue command broadcast message through the network to the lamp units. In addition, the cue number appearing in the window above the "store cue" button is also broadcast in the same message.

The communications manager program effects a data transmission through the network of the broadcast message, which message is received simultaneously by all lamp units. After the message is either transmitted, or enqueued for subsequent transmission, the communications manager program returns through the response routine and switch input sensing programs to the endless loop of the main sequencer. The main sequencer routinely services other operator commands as the need requires. However, in the services of this example, as well as many other that may be interspersed therebetween, the main sequencer is periodically preempted by regularly timed interrupts which require somewhat immediate attention. The regularly timed interrupts may be in the nature of the activation of the lamp status scanning program by the periodic interruption of the hardware timer integrated circuit which produces an interrupt to the console processor. On each interrupt generated by the hardware timer, the program commands a different lamp unit to send a message to the console containing data describing the lamp unit's current status. The type of data appearing in this message is described in more detail below in connection with the lamp processor system.

Because of the store cue command broadcast, as above described, some lamp units of the system will begin reporting the occurrence of new cue data to send to the console for storage on the disk. The lamp status scanning program handles all the lamps in the system in turn, and all lamps involved in the newly stored cue will eventually be able to send their cue data to the console. The lamp status scanning program obtains the status data for an individual lamp unit by sending a status read command message to the lamp unit through the communications manager program.

The status read command message is individually addressed by the communications manager in much the same way as described above in connection with the broadcast messages. However, since the status read message command requires a response from the particular lamp unit, the communications manager program holds the communications network channel open after transmitting the lamp command message. The communications network channel is held open until the lamp replies, or until a certain time period has elapsed with no reply. In this event, a lamp failure is assumed to have occurred. Further processing in the lamp status program is held in abeyance until a reply is received from the lamp unit.

Once the particular lamp unit has replied to the status read message, the communications manager returns to the lamp status scanning program with the message received. In this example, one of the bits in the receive message will indicate that the lamp has stored cue data in the lamp unit processor memory, which cue data has not yet been transferred to the console for disk storage. In a manner like many of the input scanning programs of the console, the lamp status program reacts only to changes in input values. The appearance of a set bit in the lamp status data causes the activation of the network state control program. A response to the change in the lamp status is thereby produced. The network state control program is provided with a group of response routines which handle the status bits received from the lamp unit. Some of these response routines provide to the console operator notice of lamp problems, such as bulb failures. Other response routines of the network state control program download program code to the lamp units, on request. The response routine associated with the data bit received in this example uploads cue data from the lamp unit, and stores the data in the proper file of the disk file system. The network state control program first checks a flag located in the console program disk state manager to insure that new cue data from the lamp unit can actually be stored. If indeed the disk is available for cue storage, the response routine then calls the communications manager program with a cue buffer upload message, as well as a pointer to an unused section of memory in which the data is to be stored. In the event the disk is not available for storage of cue data, the new data is not uploaded from the lamp unit. Instead, the front console panel indicator is illuminated, whereupon the operator is reminded that cue memory is required to be uploaded from the lamp unit to the console. This can be accomplished later by an operator command.

The cue upload command, much like the status read message described above, is sent to the particular lamp unit. The cue upload command also causes the communications manager to wait for the lamp unit reply. In the preferred form of the invention, the programmable communications circuits are set up to store the lamp unit reply in the memory space specified by the network state response routine. When the transfer of the data from the lamp unit to the console is completed, the communications circuitry interrupts the console processor. The communications manager program is reactivated. The communications manager program thus determines that the communication transmissions is complete, commences the transmission of another message, if such a message is pending, and returns to the network state control response routine.

By the involvement of the network state control response routine, the data received from the lamp unit is subdivided into file records. The same format employed to subdivide the file into records is used both in the lamp cue storage as well as in the disk file system. In certain situations, the data received may be that of several cues, since the rate of scanning the lamp status can be temporarily slower than the rate at which the operator is storing cues. In this example, it is assumed that only the data from the cue store command is the data being operated upon. The disk file already contains the lamps cue data as it existed before the cue data to be stored. Therefore, all that is required is to add or rewrite the appropriate record in the disk file. The response routine accomplishes this by calling the file manager program to open the file with the particular lamp control channel number in the cue data file directory. The foregoing is accomplished by the response routine in calling the file manager program to open the file with the lamps control channel number in the cue data file directory. The response routine then issues a write command to the file manger program, using the record data received from the lamp unit. Once the writing of this data is accomplished, the response routine calls the file manager program, and the file is thereby closed.

The file manager program performs the three functions for the cue upload response routine, as described above. The command to open the cue data file results in a search for the file descriptor in the directory of cue data file descriptors. When found, the descriptor is used to find the first fragment of the file and load it from the disk. The file record to be written comprises two parts; the cue number, and the lamp function data. The cue number is utilized as a unique index to the record. When the command is issued to write the newly received record into the file, the file manager program searches the fragment already appearing in memory to find the index of the record being written. If the index is not found in the first fragment, the other fragments of the file are examined in turn. If an existing record already contains the cue number of the record being written to the file, it is overwritten with the lamp function data of the new record. If the index is not found in the file, the record is added to the file. The command from the network state control response routine to close the file causes the file manager program to release the pointers to the data in memory relating to the file. In this manner, the network state control response routine can reuse those memory spaces whenever needed. No further access to the file can be made without issuing the file open command.

Whenever it is necessary for the file manager program to access the data stored on the disk, as opposed to the copy in the console processor memory, the disk data manager program is activated. This program provides control of the disk drive controller circuits which actually issue disk commands and reads the data from the disk. The disk data manger maintains an account of those parts of the disk currently being used, and determines the actions needed to access specific file fragments requested by the file manager. Finally, the response routine is terminated, and is returned through the network state control program to the lamp status scanning program, which is also terminated until the next timer interrupt. The foregoing describes the operation of the system, assuming the initialization of the lamp units has taken place. The detailed initialization of the lamp units are described in detail below. Each lamp unit is initialized during system power up and initialization, or when added to a functioning production light system. As described above in connection with the circuitry of each lamp unit, there is provided a processor and sufficient memory for storing various programs, which, when carried out, allow any unit device to be moved, readjusted or changed in accordance with a cue or switch actuation originating at the console.

Figure 12A:
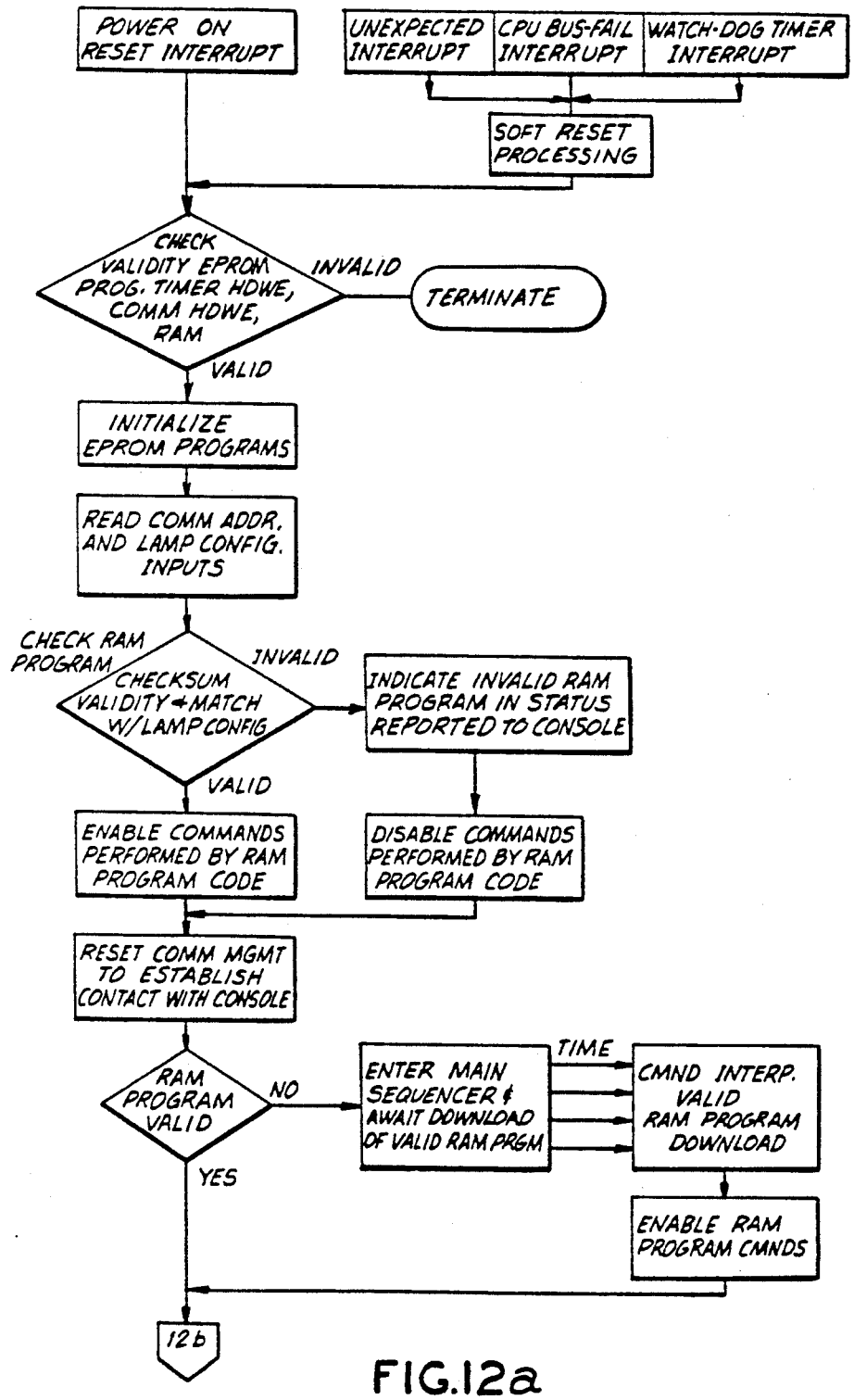
FIG. 12 (a-b) is a flow diagram illustrating the individual steps carried out in a lamp unit for initializing the lamp unit to begin operation.
Figure 12B:
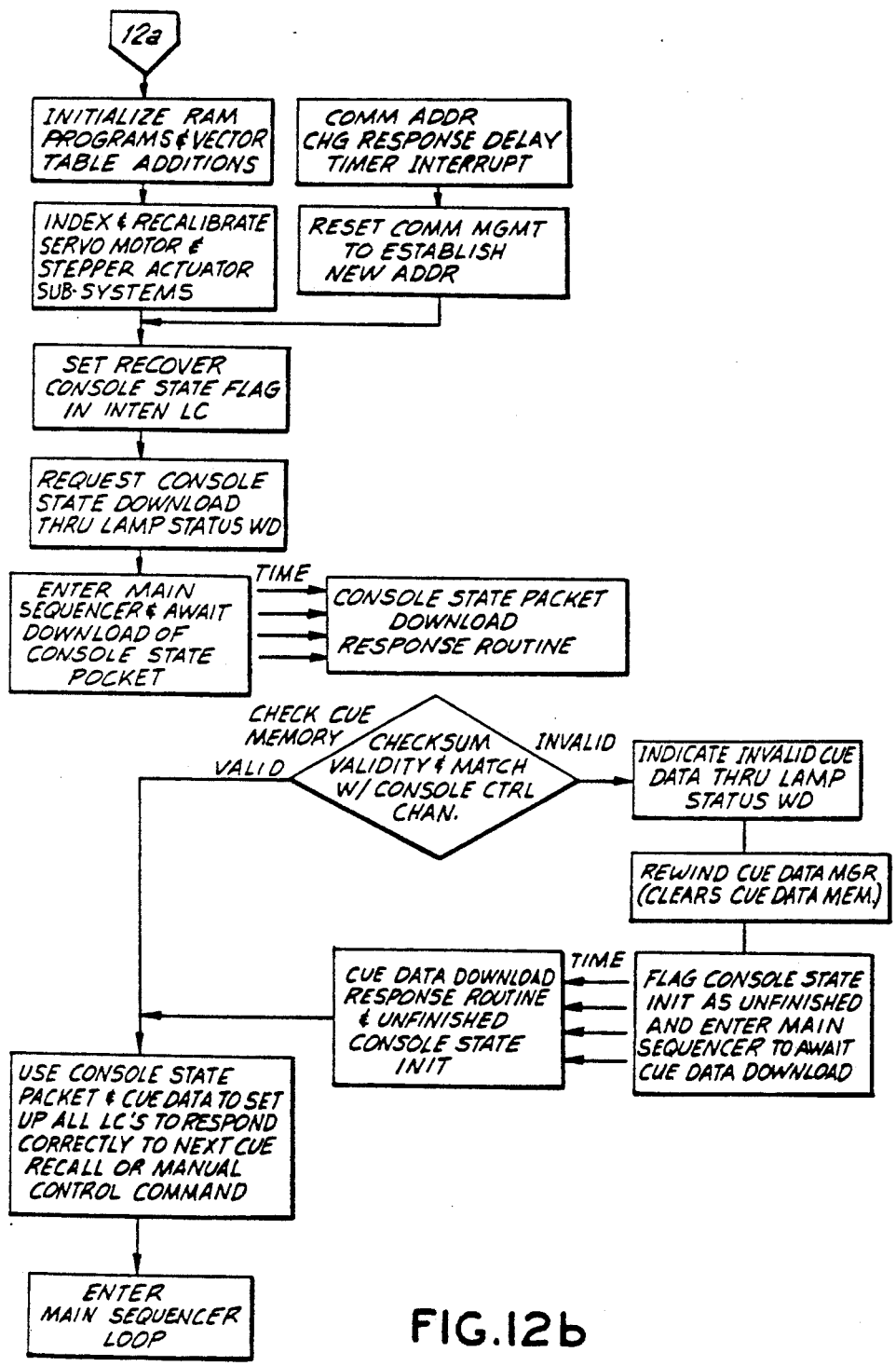

Referring now to FIG. 12(a-b), when power is applied to the system as a whole, or to a lamp unit, the lamp state initialization program is activated. This program may also be activated during normal lamp computer operation when certain interrupts occur indicating a major malfunction of the lamp system. In addition, part of the lamp state initialization program is reentered if the communications address of the particular lamp unit is changed.

Each lamp unit includes a ROM-based program which performs various functions. For example, the ROM-based program tests certain hardware necessary for the proper operation of the lamp system, the program presets various programmable circuits in the unit to predetermined known states. In addition, the program proceeds through a script calling for checks to be made on certain parts of the unit, and prescribing actions to be taken depending upon the results of the tests. At the end of the script, the lamp unit is in complete synchronization with the console, whereupon the processor enters an endless loop consisting of self tests, physical state monitoring and response to console command transmissions.

The first task performed by the initialization program is a checksum test of the validity of the programs from the EPROM memory. A test of the hardware timers against pretimed software loops is also performed. A loop back test of the communication hardware and a read/write test of part of the RAM memory is also conducted. If any of the lamp units' circuitry tested is found to be faulty, execution is halted. Once the operation of the lamp unit hardware has been tested, various program subroutines are executed to initialize program variables, and set up programmable circuits used for communications. The identity of each lamp unit is a communication address read from an appropriate input device. In the preferred form of the invention, the indentity of each lamp unit is established by the setting of a three-digit thumb wheel switch. Thus, as many as one thousand lamp units can be connected to the system, and retain an independent identity. An input to the lamp complex processor represents the configuration of servo and stepper motors associated with the lamp hardware. Since the same computer hardware and basic programs are utilized to control different combinations of actuators of the lamp complex, a portion of the lamp system programs will differ between the lamp complexes. If needed, the proper system programs for particular lamp complexes can be downloaded from the console. However, the downloading of these additional programs into the lamp units may not be necessary, as the programs are maintained in writable, nonvolatile memory in each lamp unit. As noted above, the nonvolatility of the memory is provided by battery RAM memory backup. A check is conducted next on the programs already present in the lamp unit RAM memory to determine the validity thereof. A checksum test is performed and identifiers in the programs are matched with the actuator configuration input noted above. If the programs are found to be valid, an internal flag is cleared, thereby allowing the execution of the additional programs. If additional programs are found to be invalid, a flag is set in the memory status word and the console performs a download of the program for replacement of the lamp system program memory. The flag which disables the execution of these additional programs is also set.

At this time, a communications manager program is activated to establish contact with the console processor complex. Thereafter, when the console interrogates the communication address of the lamp unit, the communication manager program will respond. The particular configuration of the lamp unit, and the results of the above-noted validity checks are reported in response to the console command. This constitutes one of the initial communications between the console processor complex and that of the lamp unit.

In the event additional programs in the lamp unit RAM memory are found invalid as a result of the above checks, further execution of the initializaiton is postponed until the programs are downloaded from the console. The lamp unit processor enters an endless loop of self tests and console command responses. At the end of the command response routine program associated with the program download, the flag which was previously set to disable execution of the additional programs in RAM memory, is cleared. The lamp state initialization script is then reentered. Eventually, a valid set of these additional programs will exist in the RAM memory of each lamp unit. Subroutines associated with the additional programs are then run to initialize additional program variables and the programmable circuits used for control of physical actuators. A table of address which guide the lamp unit processor to interrupts is also modified to reflect the presence of interrupt response routines in the additional programs. More subroutines are then called to perform calibration and indexing functions of the physical actuators and feedback sensors. The subroutines cause the various actuators to be moved through their full range of motion, noting the location of any sensors and checking for proper operation of the various actuators and feedback sensors.

In the event the communications address for a lamp unit is changed during operation of the lamp, communications are reestablished with the console in accordance with the new address. The lamp state initialization script is reentered to allow resynchronization of the lamp unit with the console for the new address.

A flag in the lamp status word is set at this time to prompt the console processor complex to transmit a packet of data containing information concerning the state of the console. This packet of data is necessary to the lamp unit to allow it to respond properly to subsequent console commands. The nature of the data in the packet comprises information relating to the position of controls in certain subsections of the console, and the console control channel number assigned to the particular lamp unit. A flag is set in the intensity logical controller to prevent the light of the particular lamp from being turned on, until adequate data has been received from the console. The initialization program then reenters the self tests/command response loop until the receipt of the console state packet.

On completion of the console state packet, command response routine, the lamp state initialization script is reactivated. The data associated with the state packet received from the console is stored temporarily while additional validity checks are performed on the cue data memory. A checksum test is conducted, and a test for a match between the control channel indentifier in the cue data, with the control channel identifier received from the console. If the cue data is found to be valid during the checksum/channel-number test, a notation of the time of the last update to lamp unit cue data is compared with that of the data stored on disk in the console. If these update times match, processing continues. In the event that more recent data is found to be stored in the lamp unit memory, console operator arbitration is invoked to determine which cue data should be used. If it is decided that more recent data is present on the disk, than in the lamp unit memory, or if the cue data is found to be invalid, a flag is set in the lamp status word. This flag prompts the console processor to download the proper cue data into the lamp unit memory. A rewind command is then sent to the cue data manager program to erase the data in memory and the self-test/command-response loop is reentered.

In the alternative, when valid cue data found to be present in the lamp unit memory, the initialization script is reentered whereupon the cue data and the console state packet are utilized to set up all function logical controllers to respond to the next manual control or cue recall command from the console. When the cue recall command is received, a flag in the intensity logical controller program is cleared. As will be recalled, this flag suppresses the illumination of lights not fully synchronized. Normal operation of the lamp unit is then allowed to commence. After this final program setup, the initialization script is terminated, and processing continues within the main sequencer loop until the occurrence of one of the activation criteria, described above.

Figure 13:
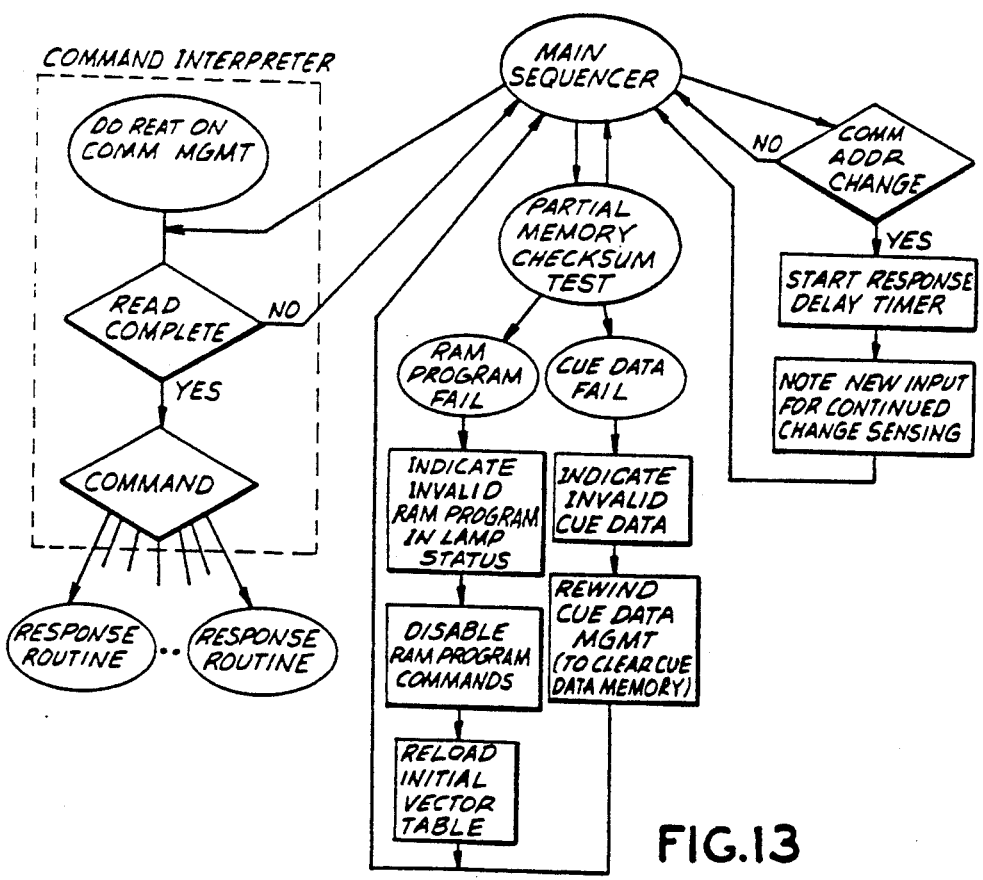
FIG. 13 is a flow diagram illustrating the basic operation of programs in the processor of the lamp unit including a main sequencer program which steps through a command reception unit and a series of test programs.

The foregoing describes in general the console and lamp unit processor interchange for accomplishing the proper initialization of the lamp units. After initialization, the primary background activity performed by each lamp unit is through each respective main sequencer loop program. Refer now to FIG. 13. Generally, the activities of the lamp unit processor in the main sequencer loop include scanning input buffers for communications received from the console processor, the performance of checksum integrity checks on both cue data and program code in the RAM memory. Also, the lamp unit processor scans changes in the communication address associated with the unit. The main sequencer loop is the program which is continuously executed in each unit, until a console command communication is received or checksum failure or address change in which event the main sequencer loop is temporarily exited. In addition, processing within the main sequencer loop is temporarily halted when interrupt-based actuator control programs are activated, or on the occurrence of physical feedback interrupts.

The main sequencer loop program itself is an endlessly repeating preset cycle for activation of a variety of subprograms. The subprograms are discussed in detail below, and include the command interpreter, the memory checksum test and the communications address scanning subprogram. In each case, when the main sequencer loop enters the subprogram, a test is conducted, in which event the main sequencer loop is reentered, or a response is performed based upon the result of the test conducted.

With regard to the command interpreter subprogram, an endless loop type of program is activated, in which event a sequence of instructions are performed. The first instruction or action performed in the command interpreter subprogram is the issuance of a read command to the communications management program. After the read command, a return to the main sequencer loop is executed. On subsequent activations of the command interpreter subprogram, checks are conducted with the communications manager program on the status of the previously issued read command. Return is made to the main sequencer loop on an indication of uncompleted processing of the read command. On an indication of the completed processing of the read command, i.e., when the check status reveals a completed communication from the console processor, the command interpreter subprogram examines the first word of the newly received data issued by the console command message, and to be executed by the lamp unit processor. If the console command is of the type which requires no further data transmission from the console, the received data is temporarily stored, and another read command is issued to retrieve the next command sent by the console. Those console commands which are received and which have associated response routines stored in the lamp unit ROM memory are performed immediately. The validity of additional programs located in RAM memory is verified before performance of other console commands. In any event, processing continues in the command response routine until the command is complete, or until all further processing of the command is interrupt-based. In this event, control is returned to the main sequencer loop. Particular types of console commands, and their associated response routines will be described below.

When activated, the memory checksum subprogram verifies the integrity of memory sections having stored therein program code and cue data. Tests are performed only on those sections of memory believed to be valid. If a checksum test of the program code fails, an appropriate flag is set in the lamp status word to prompt the console to download the program code. Furthermore, operation of the command interpreter program is limited until the program code is replaced, and thus again validated. When the console responds with the necessary download of the program code, the lamp state initialization script is reentered, as described above. In the event that the cue data is found to be invalid, the appropriate flag is set in the lamp status word, wherein the console processor is prompted to download cue data. A rewind command is dispatched to the cue data manager program to clear the invalid cue data. No further processing is required after the download of valid cue data. In both situations, once the appropriate actions have been accomplished, control is returned to the main sequencer loop.

The subprogram identified as the communication address scanning program reads the identification code of the lamp unit. As noted above, the identification code is established by a digit switch initially set to provide a unique address for the lamp unit within the communication network. This subprogram compares the value read from the switch with a copy in the memory. If the comparison shows that the identification address has changed, a timer is started. This timer will produce an interrupt of the lamp unit processor after a certain period of time. The new identification address read during the scan is stored in the memory for comparing with subsequent identification changes. In each instance in which a new identification address has been detected, the timer is restarted. No other response is necessary when the communication address is altered, until the timer interrupt occurs. A time period of five seconds, for example, is preferable to assure that an address change has been completed on the switch device. When the timer interrupt occurs, the lamp state initialization script is reentered. Processing of the address change occurs in accordance with the noted script, and as described above.

Figure 14:
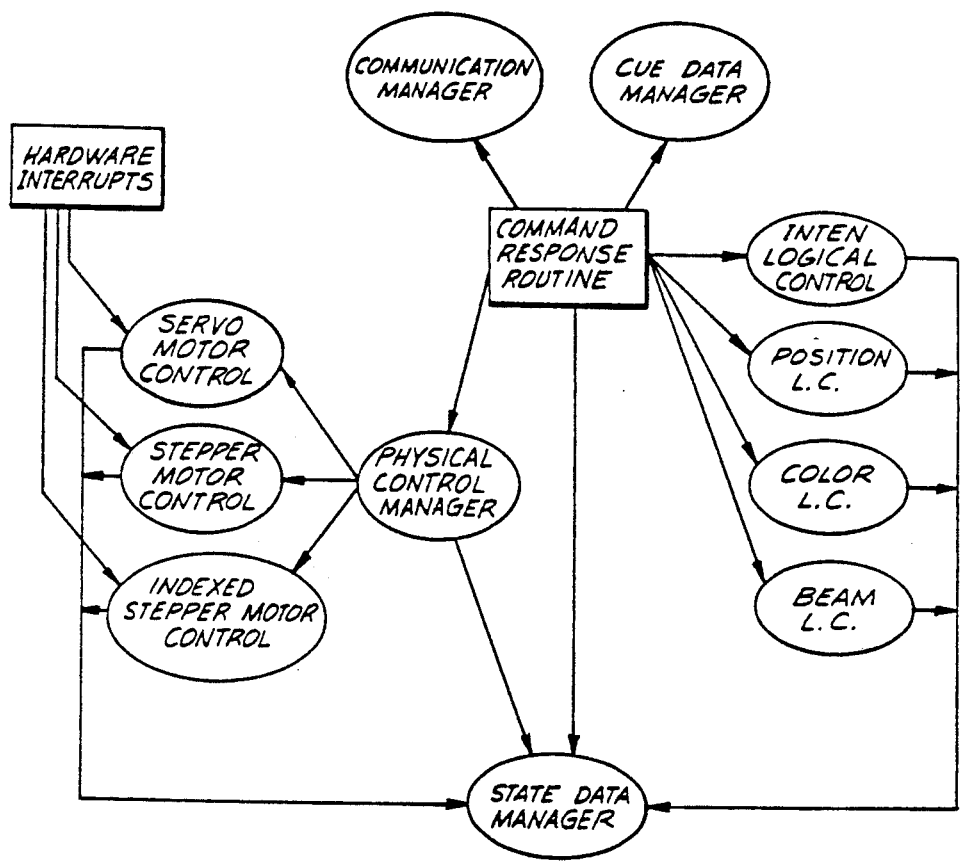
FIG. 14 is a flow diagram illustrating the operations carried out within the lamp processor for receiving parameter control commands, processing these commands and directing the physical operations that are carried out by mechanisms within the lamp unit for causing the light beam to have a selected set of parameters.

As noted above, the command interpreter is activated in connection with communications between the console processor and the lamp unit processor. Command response routines may activate one or more other program associated with this level of lamp unit processing. These other associated programs include the state data manager, the cue data manager, the communications manager, the function logical controllers and the physical control manager. Many of these programs report data directly to the state data manager program. The physical control manager oversees the activation of additional programs which control the physical actuators of the lamp unit, such as motors, dimmers, etc. The command response routines are individual scripts of the actions required to carry out a command issued from the console processor. This program flow is illustrated in FIG. 14. Some routines manipulate internal data, while others transmit specified data to the console, and yet other programs perform a specific action needed to move or otherwise control the physical actuators of the lamp unit. Some of the noted routines call for a combination of the above-specified actions. In describing the following command response routines, it is important to note that a response routine is selected based on value found in the first word of the message transmitted from the console processor to the lamp unit processor. Each of the command messages includes a unique value, known as a command identifier.

The first associated program, the state data manager routine, provides a common source and repository of status data from both the console processor and the lamp processor. Data which is received from the console processor, and which is used infrequently, is maintained accessible to the command response routine, and is retrieved upon demand. More frequently used data is passed to the function logical controllers after receipt from the console processor. Certain data, termed state data, is transmitted from the console processor in a form which includes data packed together for every lamp unit in the system. The state data is transmitted in a single simultaneous transmission to all lamp units. The state data manager extracts from the transmission, state data applicable to the particular lamp unit. The control channel assignment made by the console during the initialization script identifies the data applicable to each lamp unit. The logical and physical controllers report the various states of the unit apparatus directly to the state data manager. The state data manager combines this data from multiple sources within the unit into a single block of status data. In response to periodic console commands, each lamp unit transmits this status block to the console.

The communications manager is an associated program which has been described previously in connection with the operation of the command interpreter program. Command response routines performing the download of bulk data from the console, (RAM-based programs or cue data) issue read commands to the communications manager routine. These read commands are effective to store data sent from the console into the proper memory of the lamp unit memory. The command response routines issue write commands to the communication manager when the lamp command requires a lamp unit transmission of data back to the console. The write commands provide the proper location for access of the data within the lamp unit memory.

The communications manager routine also is responsible for the retransmission of data in the event initial transmissions were not received by the console processor. In doing so, the communications manager routine handles the fragmentation of large blocks of data, to overcome the affects of noise in communications network channels.

The cue data manager associated program comprises a conventional key-indexed file system in RAM memory. A unique, operator-assigned cue number is kept in the first four bytes of each record of the cue data file, and is used as an indexer for identifying that record. On cue recall, various indices are searched for a cue number matching that of the cue being recalled. If a match is found between the cue number searched, and those stored, the cue data record is retrieved and returned to the command response routine. The failure to find a match between indices is likewise reported to the command response routine.

Because of the many operational features of the lamp units, there is provided a logical control program for each of the physical functions of the lamp unit. While not exclusive, the various lamp unit functions may include intensity, position, color and beam logical controllers. Depending upon the manner in which the physical hardware of each lamp unit is provided with these functions, a corresponding variety of logical control programs will be implemented. The logical control program each perform a similar function of the lamp unit, by providing a single control point for each function of the physical apparatus. The services provided by all the logical control programs include receiving cue data recalled at various front panel sources, herein referred to as submasters. The services also include the integration of new cue data with previously recalled data from other submasters, changing of the current function data according to manual control command received from the console, and reporting the current function data values. Some of the logical control programs also store current function data as preset function values, and also operate in recalling and reporting these preset values on command of the console. Some logical control programs also use fader values sent from the console processor for proportional scaling of recalled cue data. The physical control manager associated program oversees activation of the subprograms which effect the changes in current function data, as computed by the logical controllers. The noted subprograms fall into two main categories. The subprograms controlling, for example, stepper motors, implement conventional algorithms which output a timed sequence of step commands to the motors. Some of the stepper motor subsystems will include switch closure indexing feedback for use in assuring that the stepper motors are following the stepping commands transmitted by the lamp unit processor. Other functions of the lamp unit involve the driving of dc servomotors to provide pan and tilt lamp movement. Lamp velocity information output by a dc servomotor tachometer, and position feedback information from an optical encoder/counter circuit are transmitted on the system data bus as feedback information to the lamp unit processor. The subprogram controlling these components utilizes a conventional velocity-feedback servo control algorithm. This subprogram is also activated upon an unexpected motion of the servo-controlled lamp function by way of hardware interrupts generated by changes in the position feedback signal. The unexpected motion of the servo-controlled lamp function notifies the lamp unit processor of movement occurring in the lamp, which movements were not commanded by the lamp unit processor. It is understood that these subprograms could be replaced by analog or digital circuitry.

Certain status data concerning the lamp unit will originate in the physical controllers. For example, the integrity of the bulb in the lamp unit light will be derived from the behavior of the power supply which supplies power to the light. The impeded motion of a lamp unit within its range of movement will be deduced when the motor motion fails to produce a corresponding movement of the lamp. Also, the failure of a stepper motor subsystem can be deduced from the failure of a search for an expected index input. This status information is reported directly to the state data manager.

In accordance with the two examples set forth above showing the console processor operations in response to the selection of the lamp for manual control, and for storing cue data, the two examples are repeated below for showing the actions taken by the lamp unit processors. The two examples exemplify the processing which occurs in the lamp units, and include the activation and interaction of the various programs within each lamp unit, and the distribution of tasks between the console and lamp units according to the invention.

The first lamp unit example concerns the sequence of actions occurring when the console operator selects a single lamp in the system for manual control, and the manipulation of a console device for changing the spatial orientation of the lamp unit. Both examples assume that all necessary RAM-based programs, together with the cue data, are in full synchronization with the console.

As part of the main sequencer loop, the lamp unit processor jumps to the command interpreter program to check the status of the outstanding read command in the communications manager program. The command interpreter program employs a block of memory space to service the communications manager program. This block of memory contains a byte of data which is used to signal the status of the execution of the read command. In servicing the read command, the command interpreter program checks the status byte of data in the command block being executed by the communications manager program. When a flag shows that the outstanding read command has been completed, i.e., that a block of data has been received from the console processor, the command interpreter program examines the first byte of this data. The value of the first byte of data represents the specific command to be performed by the lamp unit.

According to the example, the command received from the console is found to be a manual-controlled channel-selector-map command. Since this command does not require additional data from the console, the command interpreter program establishes another read command block, and reactivates the communication manager program. The communication manager program then prepares the lamp unit to receive another console command transmission and returns to the command interpreter. The command interpreter program then jumps to the associated command response routine. The noted console command represents a message transmitted to the network and received simultaneously by all the lamp units connected to the network. Noteworthy, the processing described in connection with a particular lamp unit, will also be occurring concurrently in other lamp units of the system.

Because the performance lighting system of the invention can accommodate upwardly of one thousand stage lights, bytes of data must be transmitted throughout the network, one bit position being representative of each lamp unit. The location of a bit, corresponding to a particular lamp unit, is derived from the console-control-channel number assigned to the lamp unit by the console, during the lamp state initialization script. The other lamp units of the system are assigned different console- control-channel numbers, and each unit will independently extract its own bit-data from the one hundred twenty-five byte block. The console-control-channel number is stored in the state data manager program.

The action required of the command response routine, as a result of decoding the console transmission, is to jump to the state data manager program with the location in memory of the 125-byte block. Also, the command response routine provides an identifier indicating that the manual-control status bit is to be manipulated.

The state data manager is provided with a subprogram which utilizes the console-control-channel number as an index to extract the value to be assigned to the boolean flag concerning the lamp unit selection/deselection for manual control. This boolean flag is referenced when manual-control commands are received, and either allows or disallows a reaction by the lamp unit. Control from the state data manager program is then returned to the endless loop of the main sequencer.

The lamp unit processor executing the instructions of the main sequencer program periodically enters the command interpreter program to ascertain whether a new transmission has been received from the console. It is assumed here that commands are received from the console indicating that the console operator is manipulating the lamp position controls. As a result, the next lamp unit commands received by the command interpreter are encoder-change commands. This information is determined from a first byte of the encoder-change command, whereupon a jump is made to the appropriate command response routine. Again, this command is received simultaneously by all lamp units in the network, and all such lamps will be executing the appropriate actions concurrently.

The command response routine concerning the foregoing command, first checks with the state data manager whether the boolean flag currently indicates the selection or deselection of the particular lamp unit for manual control. If the flag is not set, the command response routine terminates, and thus the encoder-change command is ignored as the lamp is not selected for manual control. However, in the current example, processing continues as the flag is assumed to be set as part of the preceding manual-control channel-selector-map command.

The encoder-change command byte transmitted by the console in response to the change of position of a console control, is accompanied by a byte of data identifying the particular console encoder. This is essential as there are several encoders on the console panel. Each encoder provides control of a different lamp function. In addition, the encoder- change command byte contains data representative of the amount of change in the encoder input value. Because each encoder is associated with a different function of the lamp unit, the command response routine executes a jump to the function logical controller associated with the encoder that has a changed input value. The command response routine also passes along the data corresponding to the amount by which the position of the lamp unit is to be changed.

With regard to the present example, the position logical controller is activated. The position logical controller reads the data representing the current command position of the lamp unit, and modifies this data by an amount linearly proportional to the received encoder change input value. This new value is now stored as the new position of the lamp unit, whereupon the position logical controller returns to the command interpreter.

Next, the command interpreter program activates the physical control manager which compares the command data presently stored in memory with all the logical controllers with the actual positional states of the lamp unit physical devices. The actual states of the physical devices are brought into conformance with the commanded states. In those situations where more than one function data has changed, the physical control manager will activate the physical actuator programs in preprogrammed combinations in order to ensure that all such actuators perform properly.

In the present example, only the servomotor control program is activated. This program calculates the direction of change called for by the new command data, as well as the appropriate magnitude of the voltage to be applied to the servomotor. An associated timer is also triggered to provide periodic hardware interrupts. At each interrupt, the servomotor control program will recalculate the appropriate voltage to be applied to the motor, until the actual state of the servomotor subsystem matches the command data established by the position logical controller.

The foregoing institute the motion of the desired servomotor to effect a corresponding change, for example, in the pan or tilt position of the lamp unit. Once servomotor motion is initiated, the lamp unit returns from the servomotor control program and the physical control manager program to the command response routine and the command interpreter. Control is returned from the latter two programs to the main sequencer where the scanning for received commands, memory checksum failures and communications address changes processing resumes. Until such time as the new lamp unit position is reached, the hardware interrupts and servomotor control recalculations are interspersed with the actions of the main sequencer's endless loop. The high level commands transmitted by the console through the network and to each lamp unit, the commands undergo additional processing in each unit to determine the effect of the command on the unit, and to accomplish the desired result, if applicable.

The next example involves the processing in the lamp unit as a result of the console operator having actuated the "store cue" switch on the console panel. The lamp unit processor exits the endless loop of the main sequencer and jumps to the command interpreter to check the status of an outstanding read command in the communications manager program. In this example, the command interpreter program discovers a newly received message from the console, having a store-cue opcode in the first byte of the command message. The command interpreter restarts the read command on the communications manager, and calls the store-cue command response routine. This command is received simultaneously at all lamp units in the network, and all such units execute the following sequence of actions concurrently.

In the command response routine, each logical controller is queried concerning the current commanded function data. This data is packed into ten bytes of memory storage area. Moreover, this block of data is combined with four bytes of data representing the operator assigned number for the cue. It should be understood that the cue number was received as part of the cue-store command transmission from the console. The command response routine then calls the cue data manager program, bringing with it the fourteen-byte block of data resulting from the above-noted processing.

The cue data manager scans its list of record indices, i.e., cue numbers, for an index matching that of the record cue number passed by the command response routine. If a match is found, the accompanying data record is overwritten with the data record received from the command response routine. If no match in the index is found during the search, a new record is written into a blank record area in the index and data file. This data memory of the lamp unit is of the type which has not yet been transmitted to the console disk copy to update the present lamp units cue data. Sufficient room should provided for several cue records should there exist a delay in transmitting the data records to the console disk storage. The cue data manager then returns to the command response routine.

The command response routine immediately calls the state data manager to set a flag in the lamp status word indicating that the lamp unit has cue data ready for transmission to the console disk storage. The programs are then returned in seriatim through each other, until the lamp unit has threaded its way back to the main sequencer. Processing within the endless loop of the main sequencer then resumes.

At some point, in the processing of the cue store command, the command interpreter senses that a message has been received having a lamp-status-report opcode. A preparatory read command is reissued to the communications manager program, and the lamp-status-report command response routine is called. These lamp-status-report commands are dispatched individually to each lamp unit in the network, wherein only one unit will respond to the console at a time.

The command response routine calls the state data manager program to obtain the current value in the lamp status words. This block of memory is utilized as the message data in a write command issued to the communications manager program. This write command has no interaction with the read command just performed in preparation for the next console command transmission. Return is had through the various programs to the main sequencer, where the endless loop is resumed.

The flag set in the lamp status data, which flag was reported to the console in the previous command, prompts the console to issue a read-cue-data-change-buffer command. This command is received by the communication manager program of the lamp unit, and is sensed by the command interpreter program. In addition, this command is addressed to a particular lamp, and only that lamp will transmit a response. A read-cue-data-change-buffer command response routine is provided for retrieving the list of new cue data from the cue data manager program. In addition, the noted command response routine sends the list as message data in a write command to the communications manager program, and calls the state data manager to clear the flag indicating data is present in the cue data change buffer. As a result, the lamp unit processor returns to the endless loop of the main sequencer, and waits further console commands.

The foregoing illustrates the lamp unit processor actions required to carry out a change in the position of a stage light, as well as the storing of cue data within the lamp unit memory. The flexibility of the system, however, is not limited to the foregoing. While an exhaustive description of each command is not necessary, and would only encumber the description of the invention, the other lamp commands used in connection with the lamp units of the invention are listed below.

The overall function of the programs to carry out the operation of the present invention have been described in detail in reference to FIGS. 10-14. A detailed code listing for a representative portion of the overall program is presented below. This is the code required for implementing the color logic control which was described in reference to FIG. 14. This code is written for execution on a Motorola microprocessor Model 68000. The color logic control program is quite similar to the logic control programs for intensity, position and beam diameter.

It can be seen from the foregoing that the lighting system disclosed provides accurate, efficient, and flexible control of several hundreds of automated lamp units. Provisions are included for the reporting of status data from the lamp units to the control console. This status data may include real-time display of parameter data including the present intensity, color, beam shape, and beam direction of the lamp units as well as any timing parameters associated with the present cue which has been recalled. Provisions are also included for the renewal of operating system programs in any lamp units which experience serious logical errors in their associated memory. Provisions are also included for the storage of parameter data associated with the various cues, which enables an operator to save the data used to execute a show and to load said data into a lighting system similarly configured but composed of discretely different lamp units which may be disposed in a different physical location from that at which the show was previously performed, for example on a different continent.

Figure 15:
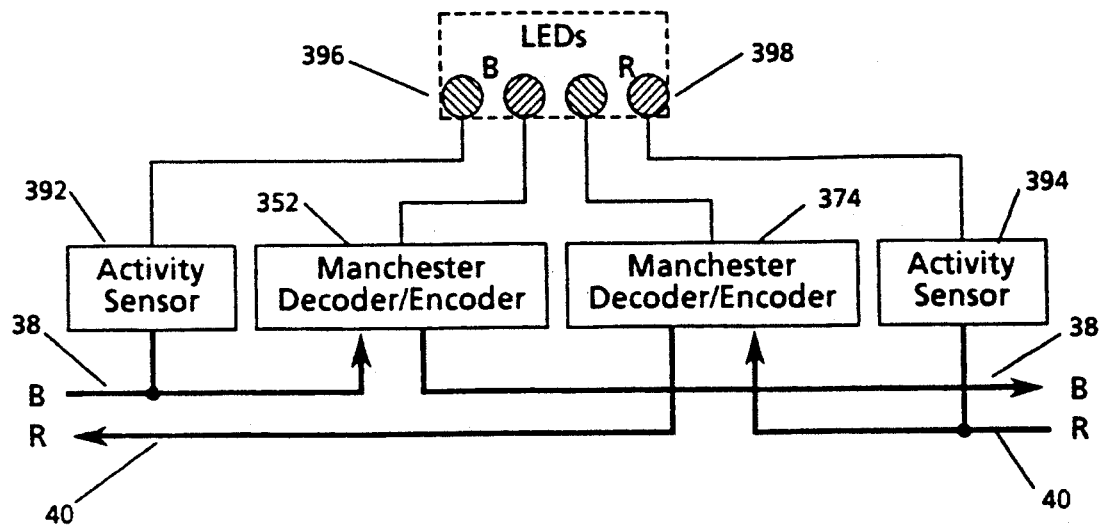
FIG. 15 is a block diagram of a repeater as shown in FIG. 9.

Referring now to FIG. 15, a simple data repeater circuit (shown in greater detail in FIG. 9), includes an activity sensor 392 coupled to the broadcast network 38 and an activity sensor 394 coupled to the reply network 40. Each activity sensor drives a red LED 396 (via pulse stretcher circuits which make the flickering of the LED visible to the human eye), which LED's are mounted on the exterior of a repeater box and flash whenever there is any electrical activity on the branch of the corresponding network to which the repeater is connected.

The simple data repeater also includes a Manchester decoder/encoder 352 coupled to the broadcast network 38 and a Manchester decoder/encoder 374 coupled to the reply network 40. As described earlier, the Manchester encoder/decoder integrated circuit can be connected in a "repeater" mode in which messages received at its input are decoded and then re-encoded for further transmission. Each decoder/encoder drives a green LED 398 (via pulse strechers), which LED's are also mounted on the exterior of a repeater box and flash whenever there is valid Manchester-encoded data passing through the repeater. In normal operation, red and green LED's will flash simultaneously. Any other condition, for example red LED flashing with no green LED flashing, indicates an error in data transmission. However, this arrangement can not detect subtle errors in the messages transmitted through the network.

Figure 16:
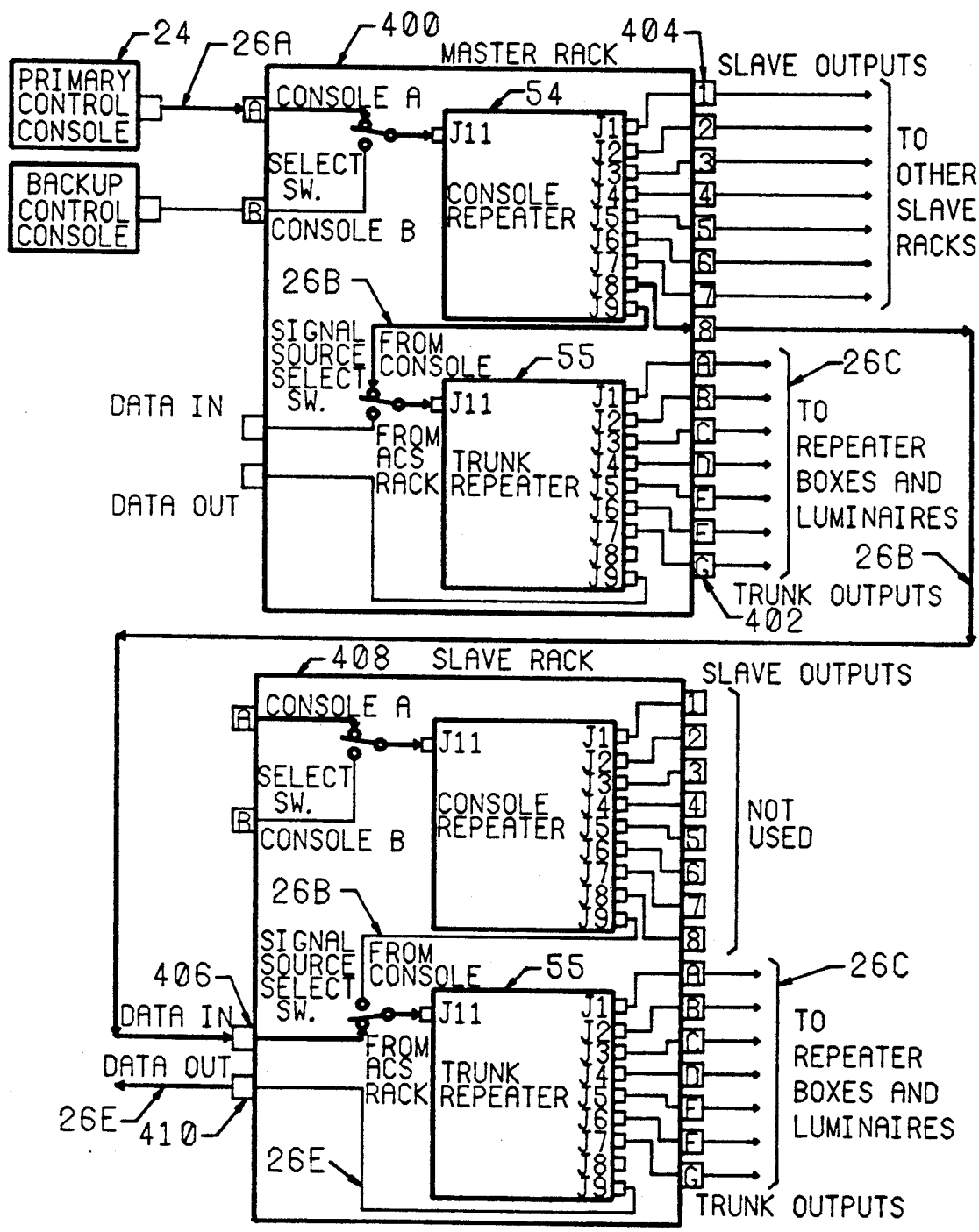
FIG. 16 is a block diagram showing the interconnection of two signal distribution racks in master/slave relationship.
Figure 17:
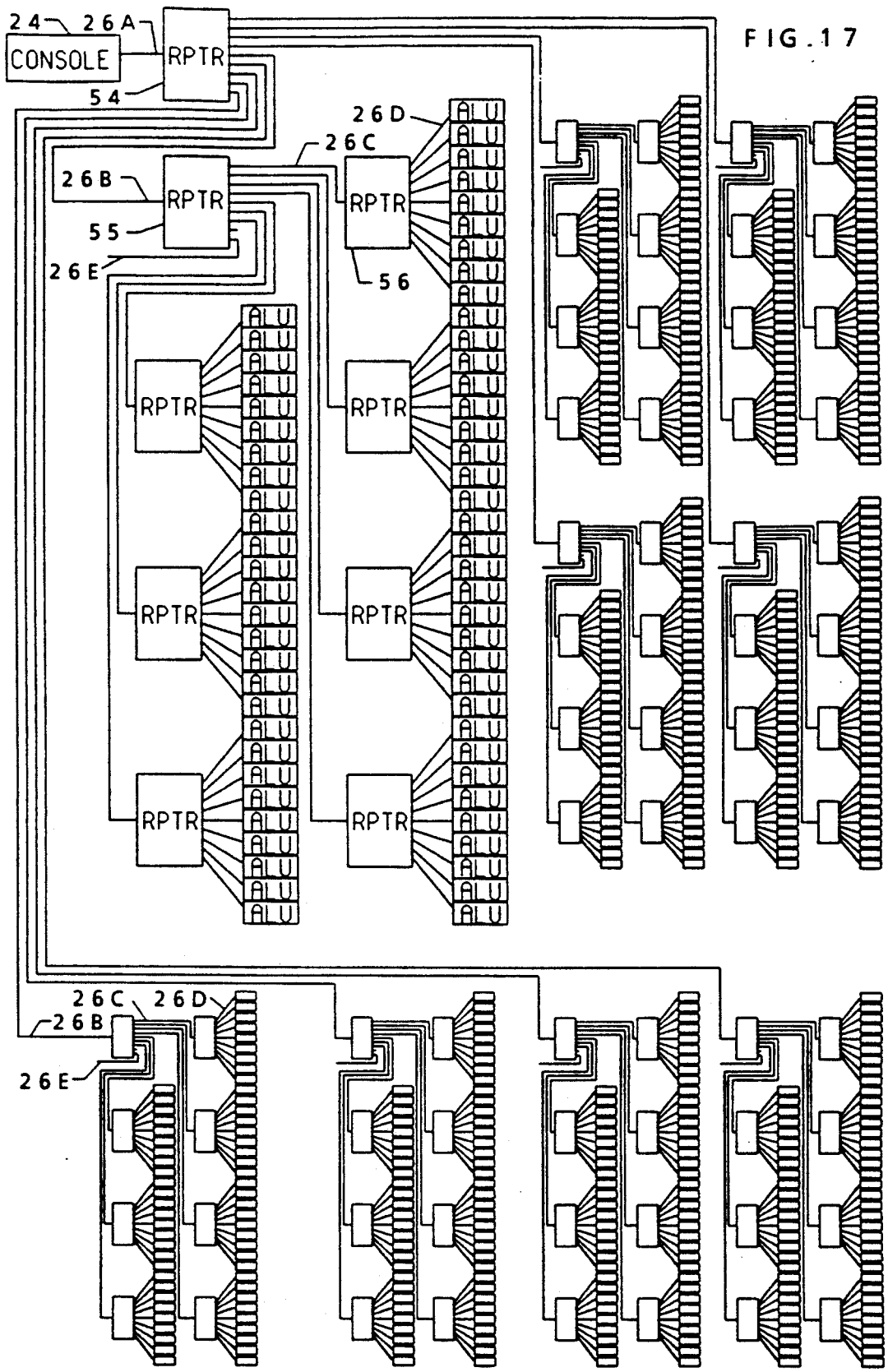
FIG. 17 is a block diagram of the lighting system according to the present invention, showing the master (console) repeater, slave (trunk) repeaters, and the various truss repeaters connecting the console and the lamp units.

As shown in FIG. 16 and FIG. 17, the data communications network 26 implemented in this automated stage lighting system includes a control console 24 communicating with a plurality of automated lamp units (ALU) through several intervening repeater circuits. A "console repeater" 54 located in a power and signal distribution rack 400 receives transmissions from the control console and repeats these transmissions to one or more "trunk repeaters" 55. One such trunk repeater 55 is normally located in the distribution rack 400 with the console repeater 54.

The trunk repeater supports data communication links 26C to seven trunk cable connectors 402 which, when connected to appropriate multi-conductor trunk cables, provide power and data to repeater boxes normally hung in a lighting truss in proximity with the lamp units. The console repeater 54 also supports links 26B to eight auxilliary data connectors 404, which in turn are used to connect to additional distribution racks 408 through appropriate data input connectors 406. Data signals are thereby provided to trunk repeaters 55 located in the additional distribution racks. The additional distribution racks then provide power and data to other repeater boxes normally hung in the lighting truss in proximity with other lamp units. Each repeater box then provides power and data for up to nine lamp units.

In one embodiment of the lighting control system, one control console 24 connects to one "master" distribution rack 400, and thereafter to eight "slave" distribution racks 408 via the auxilliary data output connectors 404. Each distribution rack connects to seven repeater boxes via the trunk cables. Each distribution rack can then provide power and data for up to 63 lamp units. One master rack and eight slave racks can then provide power and data for up to 567 lamp units. To expand the system capacity to the 1,000 lamp unit configuration supported by the system software, each slave rack 408 can connect to an additional slave rack via a data output connector 410 driven by a spare output of its trunk repeater. Eight additional slave racks so connected via link 26E provide power and data for up to 504 additional lamp units, well in excess of the 1,000 lamp units supported by the system software.

Figure 18:
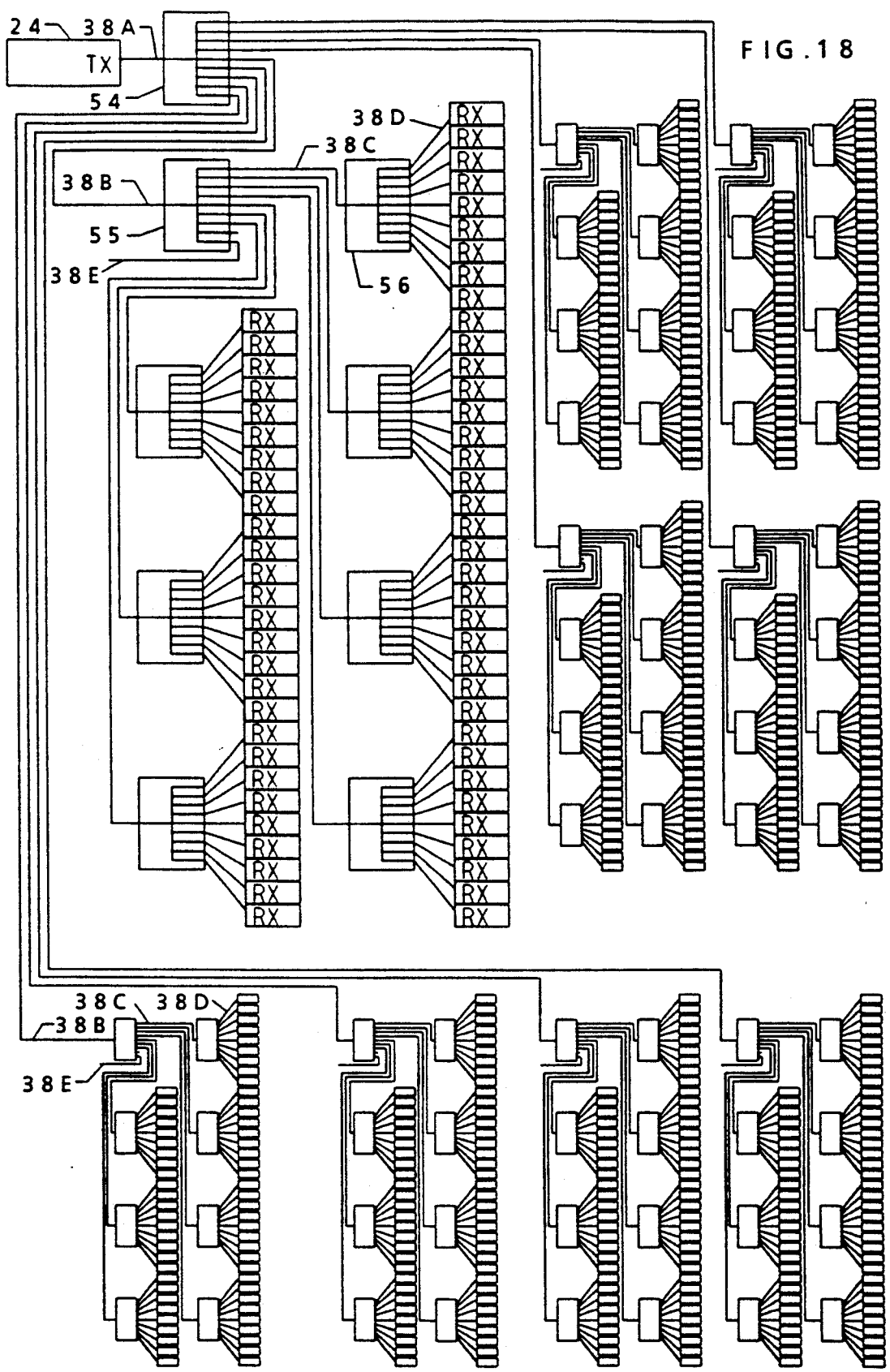
FIG. 18 is a block diagram of the lighting system showing the existing broadcast network.

As shown in FIG. 18, the broadcast network provides the same data signal to all lamp units practically simultaneously. Through the broadcast network 38 the console 24 sends each message to each receiver (RX) in each lamp unit simultaneously.

Figure 19:
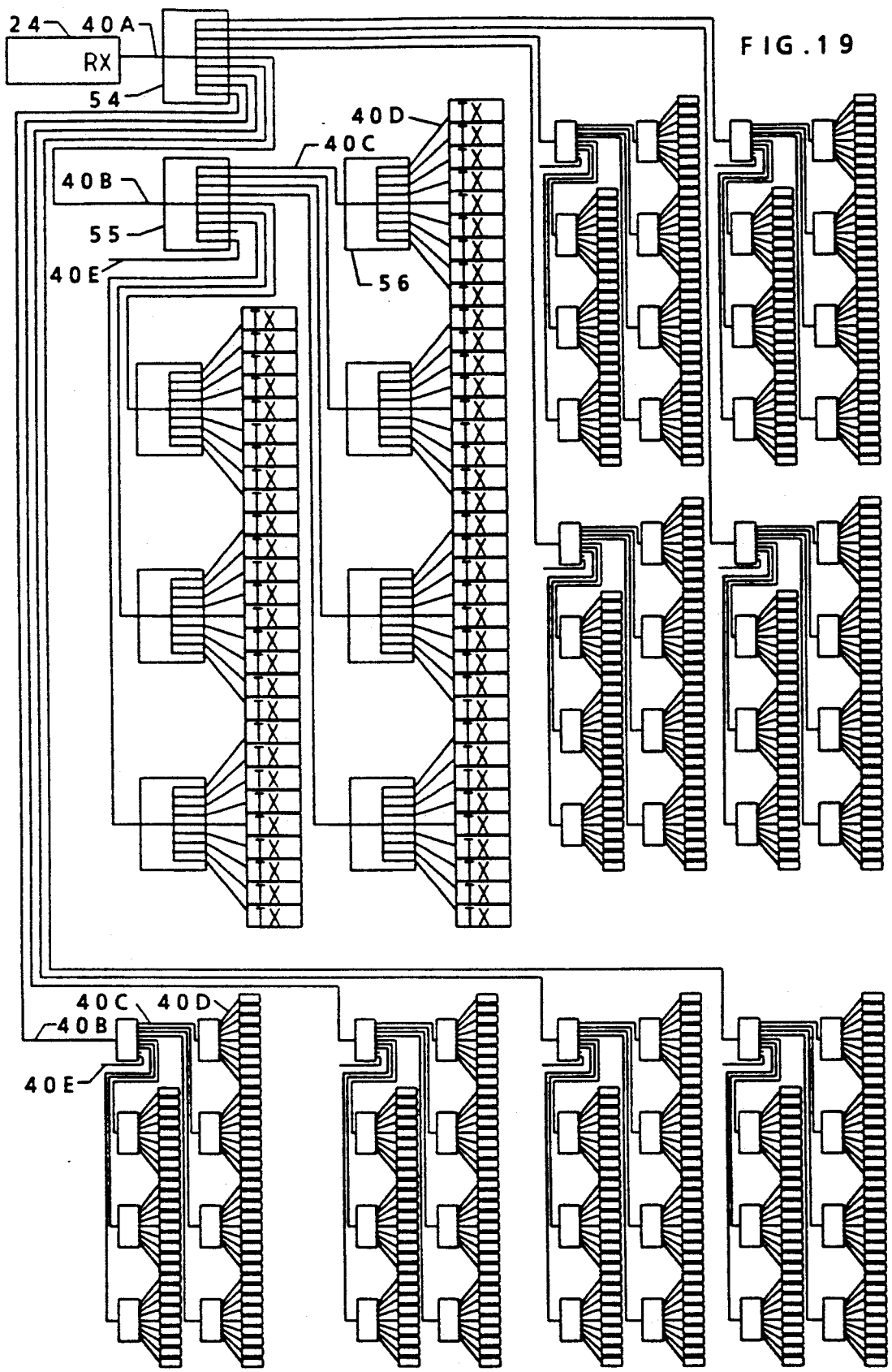
FIG. 19 is a block diagram of the lighting system showing the existing reply network.

FIG. 19 shows the interconnections of the reply network 40. The console 24 acquires status data from the lamp units by sending a message to the first lamp unit over the broadcast network 38 and then awaiting that lamp unit's response over the reply network 40. After the status report message has been received by the console from that lamp unit, the sequence can be continued for the other lamp units in the system. The reply network is connected in a fashion similar to the broadcast network, except that the lamp units include transmitters (TX) for sending messages while the console includes a receiver (RX) for receiving messages.

During each reply transmission, only one of the many links 40D between lamp units and repeater boxes is utilized. As shown in FIG. 19, a reply transmission reaches the console through only one link 40C between a repeater box and a distribution rack, only one link 40B between a trunk repeater and the console repeater, and the one link 40A between the console repeater 54 and the control console 24. Thus, if one unit of time is required to acquire status data from one lamp unit, it will take 1,000 units of time to acquire status data from all 1,000 lamp units.

It can be readily appreciated that if two or more lamp units were to respond to one request for status data, multiple transmissions would appear simultaneously on the link 40A between the console repeater and the control console. Similarly, any noise injected into the reply network would be superimposed over legitimate signals on the link 40A between the console repeater and the control console, resulting in a garbled reception by the console. Improved repeaters according to one or more aspects of the present invention provide the ability to identify and isolate erroneous lamp unit transmissions and noisy links in the reply network.

Figure 20:
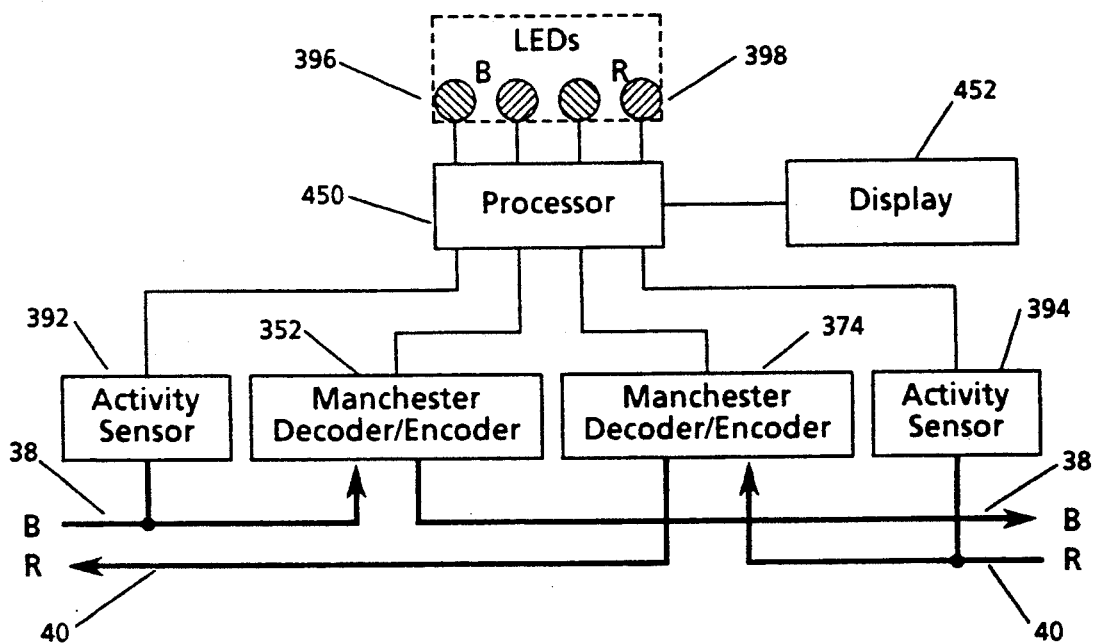
FIG. 20 is a block diagram of an improved repeater according to the present invention.

An improved repeater shown in FIG. 20 includes a processor 450 and its associated read-only memory, random-access memory, and control circut for receiving inputs from the activity sensors and Manchester decoder/encoders. The processor interprets these inputs and turns on the LED's 396 and 398 by its associated control circuit to indicate the condition of the data link networks. For example, a green LED is lit to indicate a properly working data link network while a red LED is lit to indicate a malfunctioning data link network. In the absence of any activity, both LED's can be turned off. Separate pairs of red and green LED's are provided for the broadcast and for the reply data link networks. Alternatively, an alpha-numeric display device 452 may be incorporated into the repeater circuit to display simple codes or messages.

Figure 21:
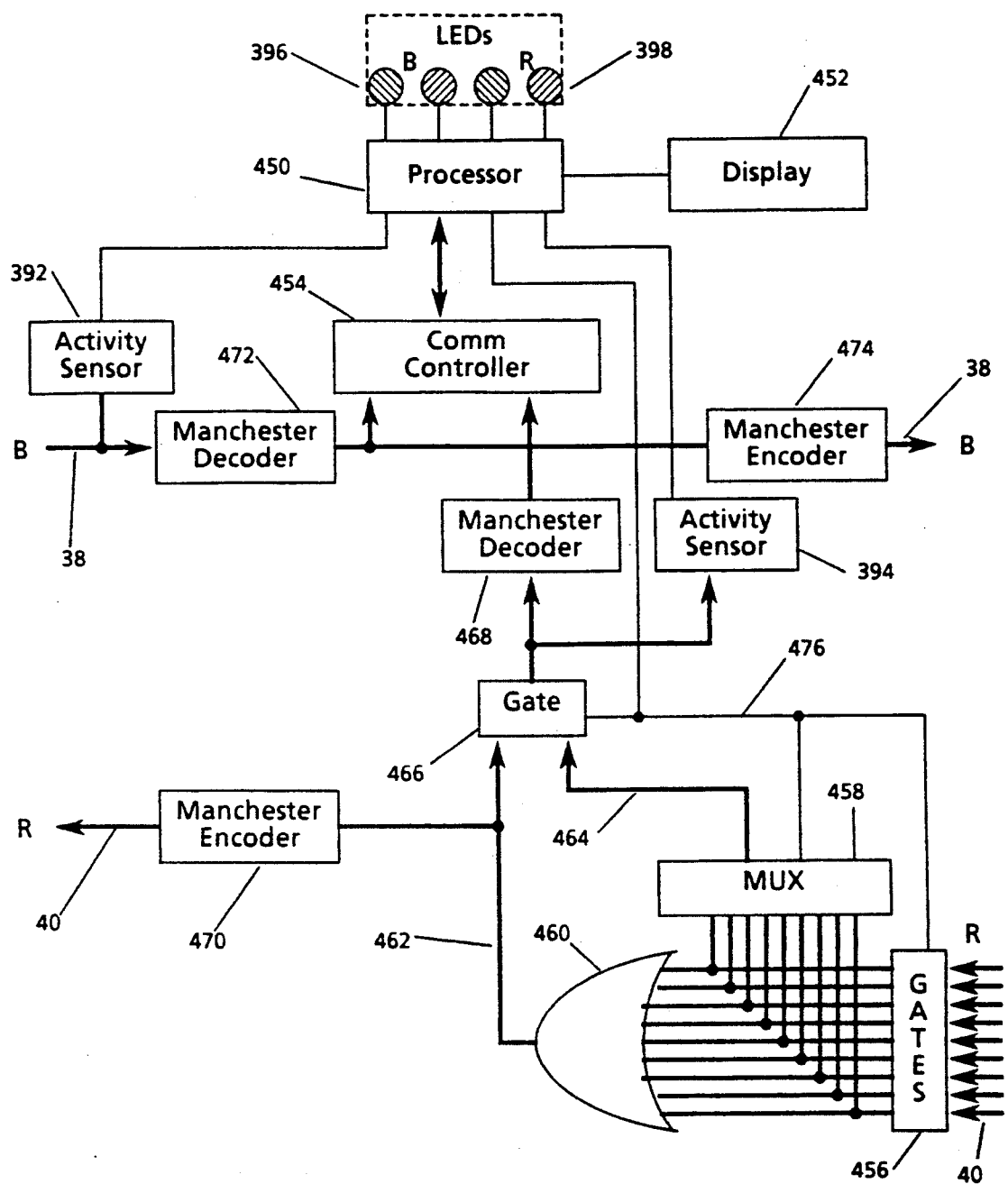
FIG. 21 is a block diagram of another improved repeater according to the present invention.

Another improved repeater shown in FIG. 21 incorporates a multi-protocol communications controller chip 454 such as used in the console and lamp unit communications circuits. Using the communications controller chip coupled to the Manchester decoder/encoders, the processor can now detect line activity not resulting in a valid communications controller interrupt. The additional gates 456 and multiplexer 458 shown enable the processor to sample individual reply line inputs and to disable certain reply line inputs to stop noise or unauthorized transmissions from spreading into other parts of the system.

In one mode of operation, signals appearing at gates 456 are applied to a nine-input logical OR gate 460 and combined into one signal on line 462. Since only one of the nine inputs to gates 456 will be active at any one time in a properly working system, only one signal will appear on line 462 at one time. The signal on line 462 is connected via logic gate 466 to Manchester decoder 468 and thereafter applied to communications controller 454 where it can be examined for errors by processor 450. If no errors are detected, the processor and communications controller transmit the message via Manchester encoder 470 onto the next branch of reply network 40.

If errors are detected in the signal received over reply network 40, a diagnostic mode is entered by the repeater processor 450. Using a plurality of logic control signals shown as control bus 476, the processor 450 operates multiplexer 458 to sample the various discrete signals at the input to OR gate 460. The output of the multiplexer 458 o line 464 is applied to gate 466 which is operated via control bus 476 to connect the multiplexer 458 to Manchester decoder 468.

By coordinating the operation of the multiplexer 458 with the communications controller 454 in error detection mode, the processor 450 may determine that one of the lamp units connected thereto is transmitting unintelligible signals or noise or is transmitting at inappropriate times, thereby garbling other legitimate signals. The processor then utilizes control bus 476 to disable the offending input at gates 456, thereby restoring communication integrity for the properly functioning lamp units.

Broadcast messages are handled in a similar fashion. Signals appearing on broadcast network 38 are applied to Manchester decoder 472 and thereafter to communications controller 454 where they can be examined for errors by processor 450.

Figure 22:
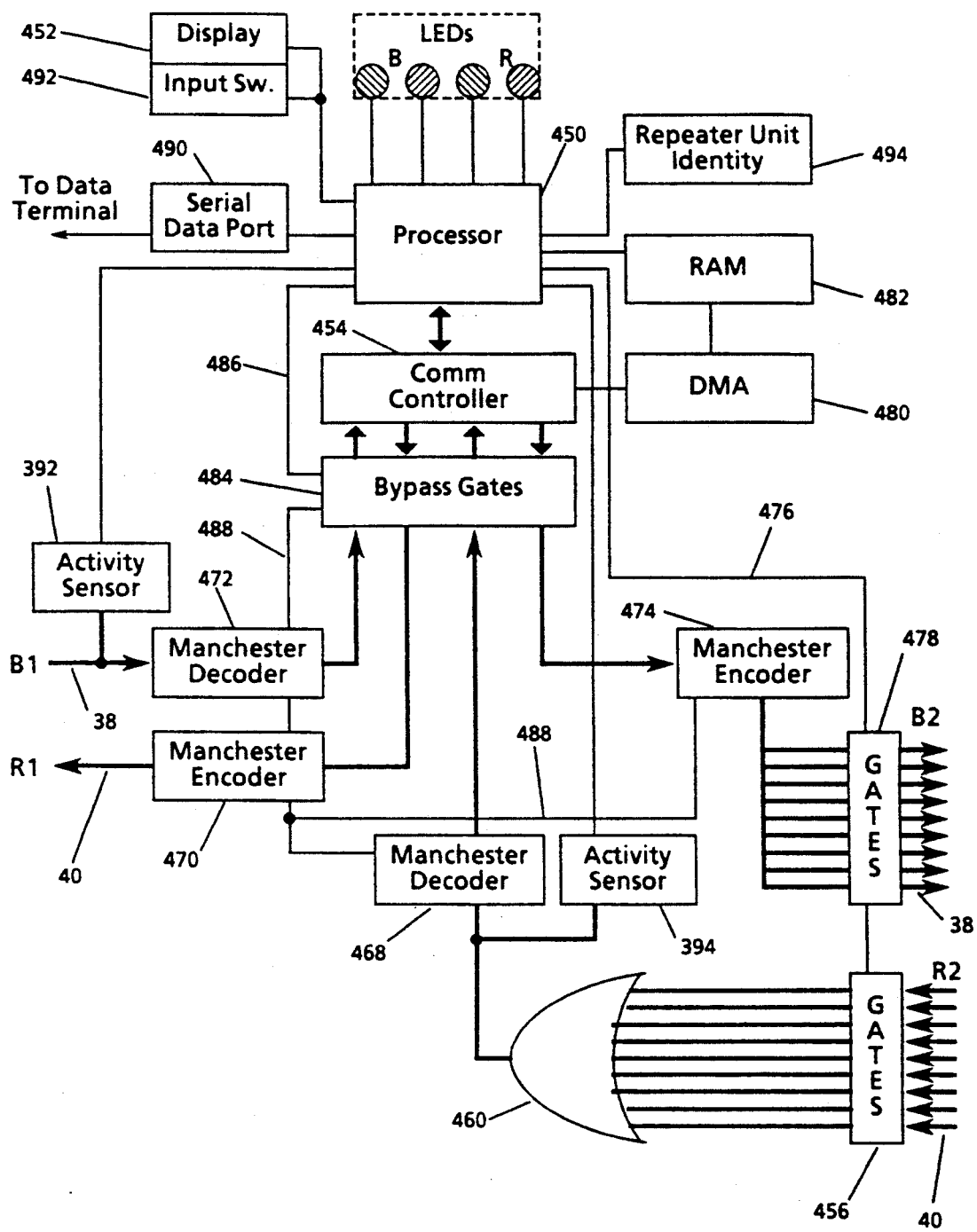
FIG. 22 is a block diagram of a "smart" repeater according to the present invention.
Figure 23:
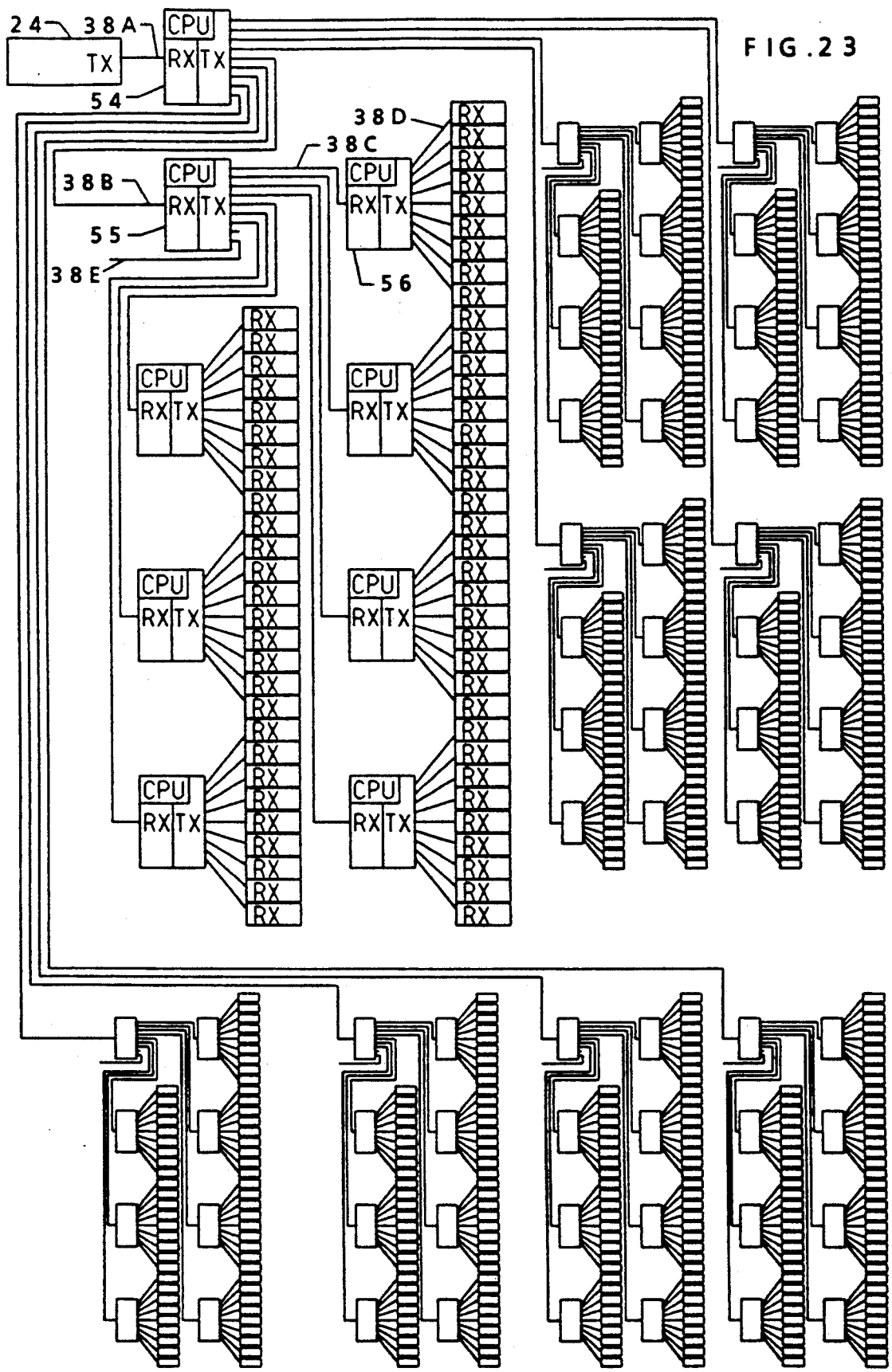
FIG. 23 is a block diagram of the lighting system showing an improved broadcast network according to the present invention.
Figure 24:
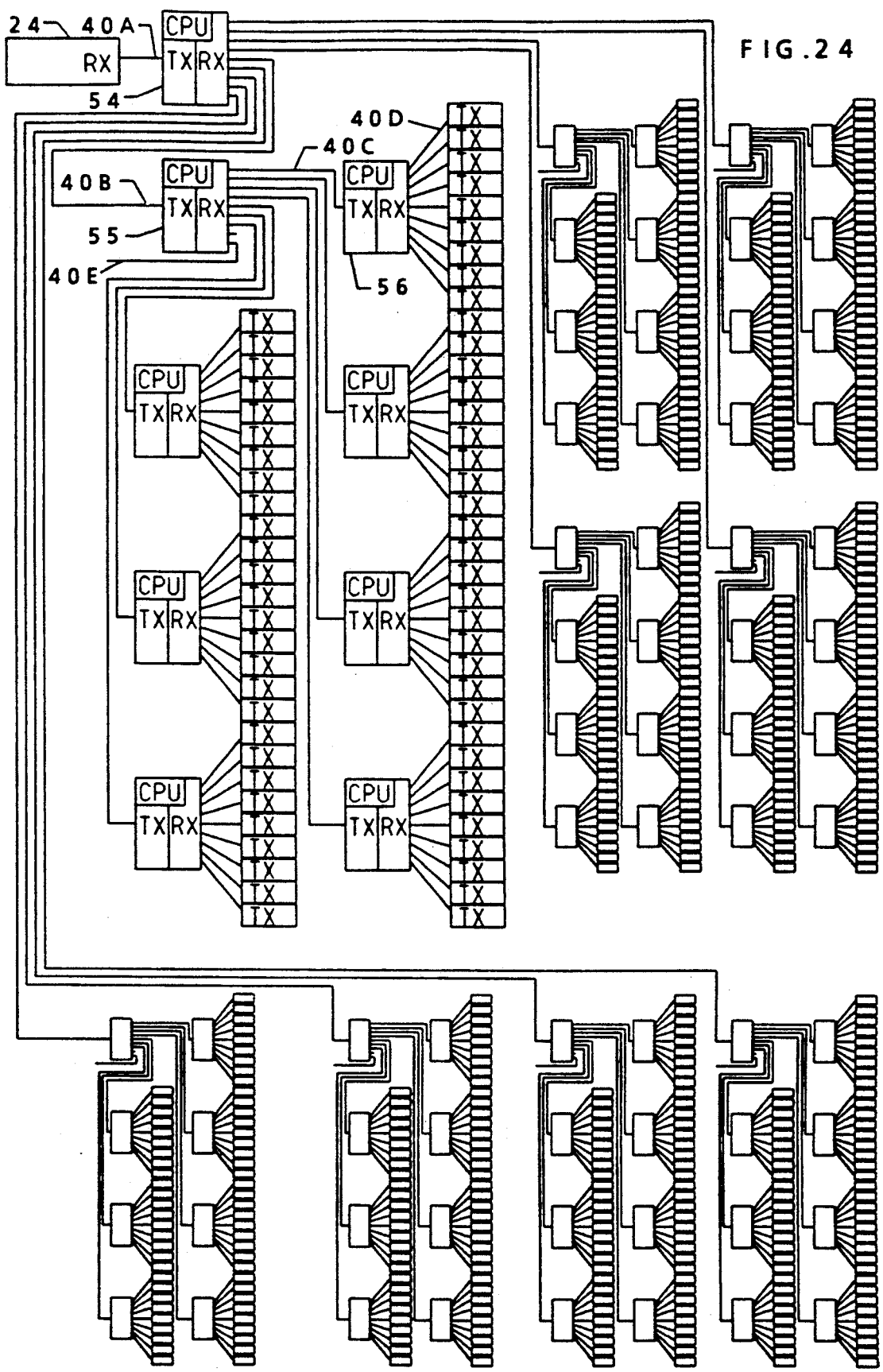
FIG. 24 is a block diagram of the lighting system showing an improved reply network according to the present invention.

According to another feature of the present invention, a "smart repeater" shown in FIG. 22 further includes a direct memory access (DMA) controller 480 connected between the communications controller 454 and random access memory (RAM) 482. This configuration is functionally equivalent to the processor/modem complex used in the control console and in the lamp units. One of the advantages derivable from this circuit arrangement is that each smart repeater can now communicate with the console just as any lamp unit can.

The console can send network control messages which are received by all repeater units practically simultaneously. A network control message may be addressed to a specific repeater unit or the message may be addressed to all repeater units using a common repeater address. Each repeater unit individually responds to the message depending on the address or the content of the message. For example, a message instructing the repeaters to begin status polling of the lamp units would be sent to a common repeater address. A message instructing a specific repeater to transmit a block of lamp unit status data to the console (or to the next repeater unit along the reply network) would be sent to a specific repeater address. The repeater also sends network state messages as required, which messages include for example: data representing the kinds of errors detected, which branches of the network exhibit errors, and which branches have been disabled.

In one mode of operation, signals appearing on broadcast network 38 are detected by activity sensor 392 and decoded by Manchester decoder 472. The signals are then routed through bypass gates 484 to communications controller 454. DMA controller 480 and communications controller 454 receive the signals into RAM 482 where the decoded message can be examined or interpreted by processor 450. If no errors are detected and the message contains information for lamp units, the processor may compose a new message or re-transmit the original message to the lamp units. DMA controller 480 and communications controller 454 then cooperate to transmit the message through bypass gates 484 via Manchester encoder 474, which is coupled to broadcast network 38 by gates 478. Using control bus 476, now reconfigured to operate the gates 456 and 478, processor 450 can transmit broadcast signals to all nine outputs coupled through gates 478, or to any one or more individual output coupled thereto. Control bus 476 also operates input gates 456 so that selected individual inputs can be disabled or enabled in the manner described above.

In the reply mode, if errors are detected in the signal received from the reply network 40, the repeater unit may request the lamp unit to transmit the message again. If after several tries, the repeater cannot get an error-free message from a particular lamp unit, or if the repeater processor detects errors on two or more channels connected thereto, a diagnostic mode is entered by the repeater processor. If no errors are detected, the processor and communications controller transmit the message via Manchester encoder 474 onto the next branch of the reply network 40.

Other improvements derivable from a smart repeater include: detecting line activity not resulting in a valid communications controller interrupt; reception of framing errors, cyclical redundancy check (CRC) errors, or overrun errors detected by the communications controller; detecting errors in the header data added to each message by communications software; detecting logical errors in some of the data messages; receiving not-acknowldge (NACK) or detecting lack of an acknowledge (ACK) signal in response to transmitted messages; disabling reply line inputs to stop noise or unauthorized transmissions from spreading into other parts of the system; collecting status data from a plurality of lamp units or status data from other repeaters; and downloading operating system programs to lamp units or repeaters.

Advantages derived from the above improvements include: 1) improved feedback to the system technician, making the data link indicators easier to read and understand; 2) reporting the location of sensed errors back to the console for display at a central location; 3) improved ability of the system to operate in a degraded mode (communications errors present); and 4) improved through-put of the communications subsystem in the normal mode, especially as relates to status polling.

A smart repeater according to the present invention, as shown in FIG. 22, enables dramatic improvements to both the utilization of communication links and the time required to collect data from all the lamp units. Once the console sends a message initiating the process, for example a message broadcast to a common repeater address, all of the truss repeaters 56 simultaneously collect data from the nine lamp units connected to each truss repeater. All of the trunk repeaters 55 then simultaneously collect blocks of data from the seven truss repeaters 56 connected to each trunk repeater 55. The console repeater 54 in master distribution rack 400 then collects blocks of data from the nine trunk repeaters 55 connected to the console repeater 54, and sends the entire block of all data collected to the console 24 in one message.

According to the preferred embodiment, the utilization of communication links is increased because 63 truss repeaters 56 are using 63 links 26D at any one time. Only nine units of time are required to collect status data from 567 lamp units into the truss repeaters. Thereafter, nine trunk repeaters 55 are using nine links 26C at once. Seven units of time are required to collect status data from 63 truss repeaters into the trunk repeaters. The one console repeater 54 still uses only one link 26B at a time, and requires nine units of time to collect status data from the nine trunk repeaters.

More significantly, the console receives status data from 567 lamp units in one transmission from console repeater 54 over reply link 40A, thus saving the time required to transmit 566 message headers. The same volume of data is transmitted with much less overhead. Thus, the improved lamp-to-console reply process results in drastic reductions in both the time required to collect status reports and in the probability of error. Moreover, while the lamp units are transmitting data to the truss repeaters, trunk repeaters are transmitting data to the console repeater; and while the truss repeaters are transmitting data to the trunk repeaters, the console repeater is transmitting data to the console; thereby further increasing utilization of the data links. In this way the smart repeaters interleave their own status information into the collection of lamp unit status data.

A smart repeater according to the present invention maintains operating system programs for all lamp units connected thereto and performs any necesssary downloads without tying-up the whole system. The storage and download of the operating system programs may be made depending upon the configuration of the respective lamp units. In the case of a truss repeater performing such a down-load, only the other eight lamp units connected thereto are prevented from receiving any system cue commands during the down-load, the rest of the system being free to operate normally. Moreover, if all lamp units require operating system down-load, several smart repeaters hanging in the lighting truss can perform the operation in much less time than one control console can.

A smart repeater as shown in FIG. 22 includes a set of gates 478 for the various broadcast link outputs and a separate set of gates 456 for the various reply link inputs. This arrangement enables the smart repeater to communicate with selected lamp units individually. If, for example, two lamp units are accidentally set to the same address, both will transmit status reports upon receipt of a request for status. This results in garbled reception at the repeater. The smart repeater then transmits to each output individually, requesting from the lamp unit connected thereto the identity or address assigned to that lamp unit, and receives the response over the corresponding input. If two lamp units are set to the same address, the smart repeater determines this to be the case and reports the information to the console for display to an operator. The smart repeaters themselves can be identified by the setting of form and function switches (to identify the processor as a repeater and not a lamp unit) and by the setting of thumbwheel switches (to identify which repeater the processor is), both of which are included in a repeater unit identity circuit 494. Alternatively, the console repeater 54 can assign an identity to each trunk repeater 55 connected thereto, transmitting that identity via each of its nine outputs one-at-a-time. Thereafter each trunk repeater 55 can assign an identity to each truss repeater 56 connected thereto, transmitting that identity via each output one-at-a-time.

Any system utilizing processor-controlled devices must accomodate the possibility of a processor lock-up, a condition in which the processor may cease to perform its normal function due to corrupted data or the inadvertent execution of an endless loop of program instructions. The smart repeater of the present invention anticipates this possibility and provides a set of logic gates 484 associated with the communications controller, which route signals to and from the Manchester decoders and encoders and the communications controller. In a default state, the bypass gates route the output of the broadcast decoder 472 to the input of the broadcast encoder 474, while also routing the output of the reply decoder 468 to the input of the reply encoder 470. Each of the decoders and encoders themselves are connected in a default state as "repeaters", re-encoding the signal which appears on its input and providing the signal to its output. The default state of the signal repeater unit at initial power-up is that of a "dumb repeater", the operation of which is similar to repeater 52 as shown in FIG. 9.

When the processor in the smart repeater initializes and begins to execute its stored programs, one periodic function is to reset, via control line 486, a hardware timer incorporated in the bypass gates 484 and switch the gates so that all signals are routed through the communications controller. Control logic gates associated with the bypass gates produce logic signals 488 which are applied to the Manchester devices to reconfigure the devices from repeaters to encoders or decoders as required. As long as the processor continues to function normally, and periodically reset the hardware timer associated with the bypass gates 484, the unit functions as a smart repeater. If the processor fails and ceases to properly execute its programs, the timer times-out and the unit switches over to dumb repeater mode. The provision of a dumb repeater mode for default or emergency operation ensures continuity of the system data communications network in the event of a processor failure in one of the signal repeater units.

Any of the processor-controlled repeaters of the present invention can be provided with a standard serial data port 490 for connection to a portable or hand-held data terminal. A technician can connect such a terminal to a serial port connector provided on a repeater box or on a distribution rack and use the terminal to initiate diagnostic tests of the data link system, and receive test results and/or status data. For example, if the red reply link LED is lit on one repeater box, a technician can plug into the box with a hand-held data terminal to receive more detailed information about the indicated malfunction. A technician can also use the terminal to initiate further tests, which may be executed by the processor at the repeater, or which may be requested of the control console via a message sent from the repeater.

A portable data terminal can communicate with the repeater processor in the spare time between handling system commands and lamp unit responses transmitted over the data link network. A technician using the terminal can transmit a message to the console requesting a system command message be transmitted to one or more lamp units. The technician can for example start and douse bulbs this way while working in the lighting rig. Alternatively, a technician using the terminal can transmit a message to one or more lamp units connected to the signal repeater unit. A terminal connected at a distribution rack can transmit messages to one or more of a plurality of truss repeaters connected thereto.

As an alternative to the portable data terminal, a smart repeater may include an alphanumeric character display 452 for indicating the status of the data link network by displaying error codes or similar human-readable messages. A plurality of push-button switches 492 may be provided as input devices, and may be used in conjuction with a simple menu of input choices written to the display unit by the processor. This way, a technician may request error code reports, intitiate diagnostic routines or other functions by communicating with the repeater unit processor through a simple, built-in data terminal arrangement.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

We claim:

1. A lighting system comprising: a plurality of multiple parameter lamp units each with a least one associated lamp and respective processor control means for adjusting parameters of the associated lamp; a remote control console system for exercising control over said lamp units; a communication control system for controlling communication between said console and said lamp units; and a data link network between said communication control system and said lamp units, said data link network including a plurality of signal repeater units each having a processor coupled to said data link for monitoring data link network signals.

2. A system according to claim 1 in which each of said signal repeater units includes switching means associated with said processor for selectively coupling said repeater to certain branches of said data link.

3. A system according to claim 1 in which each of said signal repeater units includes memory for storing datalink signals for execution by said processor.

4. A system according to claim 1 including means in each repeater unit processor for distinguishing between messages transmitted by said control console system to said lamp units and messages transmitted to said signal repeater units.

5. A system according to claim 1 in which each of said repeater units includes repeater identification means for distinguishing each repeater unit from another repeater unit and means associated with said processor in each repeater unit for recognizing messages transmitted to a specific signal repeater unit.

6. A system according to claim 1 in which said signal repeater units determine the respective configuration and address of lamp units connected thereto.

7. A system according to claim 6 in which said signal repeater units download lamp unit operating programs to said lamp units.

8. A system according to claim 1 in which said signal repeater units receive and store lamp unit operating programs downloaded from said control console system.

9. A system according to claim 1 in which each of said signal repeater units includes display means coupled to said processor for displaying repeater communication activity.

10. A system according to claim 1 in which each of said signal repeater units includes a serial data port associated with said processor for communicating with an external control device wherein said external device is capable of transmitting messages to any repeater, lamp or console connected to said respective signal repeater unit.

11. A system according to claim 1 in which said control console system includes a plurality of console controllers, each of which is capable of alternatively or additionally controlling said lamp units.

12. A system according to claim 1 wherein said processor in each of said repeater units cooperates in error detection and correction functions.

13. A lighting system comprising: a plurality of multiple parameter lamp units each with at least one associated lamp and respective processor control means for adjusting parameters of the associated lamp; a remote control console system for exercising control over said lamp units; and a data link network between said console control system and said lamp units, said data link network including a plurality of repeater units each including processor means for controlling said respective repeater and for monitoring data link signals.

14. A lighting system according to claim 13 including memory means for storing data link signals for execution by said processor means.

15. A lighting system according to claim 14 including a communications controller for selectively coupling the respective repeater unit to selective branches of the data link network.

16. A system according to claim 15 including means in said communication controller for enabling a plurality of said signal repeater units to simultaneously poll respective lamp units connected thereto to determine their status.

17. A system according to claim 15 including means in said communicating controller for communicating system commands entered on said data terminal device to any of the lamp units.

18. A system according to claim 15 including means in said communication controller for communicating system commands entered on said data terminal device to the control console.

19. A system according to claim 15 including means in said communication controller for automatically assigning unique identities to each signal repeater unit in dependence upon the interconnection of said repeater units.

20. A lighting system according to claim 14 wherein said stored signals in said memory means include stored programs for execution by said processor means.

21. A system according to claim 13 including means in said signal repeater units for transmitting signals received at an input terminal directly to an output terminal, or for receiving said signals into said memory means, depending upon the current state of said repeater unit.

22. A system according to claim 13 including means in said signal repeater units for checking the validity of data downloaded from said console.

23. A system according to claim 13 in which said signal repeater units systematically poll lamp units connected thereto to determine their status.

24. A system according to claim 13 in which certain signal repeater units poll other signal repeater units to collect lamp unit status data.

25. A system according to claim 13 including means in each of said signal repeater unit for connecting an external data terminal device for communicating with the components connected to the respective repeater unit.

26. A lighting system according to claim 13 wherein each of said repeater units includes means for reconstructing a clock signal having the same timing characteristics as in said control console.

27. A lighting system according to claim 13 wherein each of said repeater units includes Manchester encoders and decoders for encoding and decoding said repeater signals.

28. A lighting system according to claim 13 wherein each of said lamp units includes a transmitter for sending messages to said control console through said data link network.

29. A lighting system according to claim 13, wherein each of said repeater units further includes a direct memory access controller associated with said communication controller and said memory means.

30. A lighting system according to claim 13 in which said control console system includes a plurality of console controllers, each of which is capable of alternatively or additionally controlling said lamp units.

31. A lighting system comprising:
a plurality of lamp units at least some of which comprise:
- (1) means for producing a light beam having a plurality of adjustable parameters relating to beam characteristics and beam position;
- (2) drive means for controlling a plurality of said parameters;
- (3) lamp processor means for controlling said drive means; and
- (4) lamp memory means for storing data and programs for execution by said lamp processor means;

control console means having:
- (1) means for receiving parameter-controlling inputs for directing the operation of said lighting system; and
- (2) central processor means for monitoring said inputs and for originating system commands;

a data link system including a common path for connecting said control console means to each of said lamp units for transmitting said system commands concurrently to said lamp units; whereby said lamp processors individually monitor and respond where required to said system commands to control said drive means for adjusting the parameters of the respective lamp units;

communication means linked to said control console means; and additional control means having parameter-controlling inputs for directing the operation of said lighting system and means for monitoring said inputs for originating system commands coupled to said communication means whereby said lamp units may be controlled additionally or alternatively by said additional control means.

32. The system according to claim 31 in which said communication means comprises a bidirectional bus.

33. The system according to claim 31 in which other of said lamp units comprise fixed position lamps.

* * * * *